US010387372B2

(12) United States Patent
Karri et al.

(10) Patent No.: US 10,387,372 B2
(45) Date of Patent: Aug. 20, 2019

(54) VALUE-BASED DIFFERENTIAL DATA

(71) Applicant: o9 Solutions, Inc., Dallas, TX (US)

(72) Inventors: Rajeev Karri, Bangalore (IN); Amit Agarwal, Bangalore (IN); Siddarth Wardhan, Bangalore (IN)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 13/673,963

(22) Filed: Nov. 9, 2012

(65) Prior Publication Data

US 2017/0139909 A1 May 18, 2017

(51) Int. Cl.
*G06F 16/16* (2019.01)
(52) U.S. Cl.
CPC .................. *G06F 16/164* (2019.01)
(58) Field of Classification Search
CPC ......... G06F 17/30315; G06F 17/30442; G06F 3/0608; G06F 17/2241; G06F 17/2247; G06F 17/30312; G06F 17/30463; G06F 17/30327; G06F 17/30345; G06F 17/30356; G06F 17/30371; G06F 17/30519; G06F 17/30551; G06F 17/30595; G06F 3/06
USPC ... 707/E17.002, E17.01, 609, 625, 705, 712, 707/736, 791, 802, 999.2, E17.001, 707/E17.012, E17.032, E17.044, 602, 707/606, 607, 692, 718, 719, 722, 737, 707/770, 778, 792, 999.004, 999.005, 707/999.007, 999.101, 999.103, E17.007, 707/E17.009, E17.033, E17.045, E17.049, 707/E17.051, E17.055, E17.059, E17.089, 707/E17.131, E17.136, E17.137, E17.141, 707/610, 611, 638, 716, 741, 758, 760, 707/765, 771, 776, 803, 804, 822, 825, 707/828, 899, 999.002, 999.102, 999.104
See application file for complete search history.

(56) References Cited

U.S. PATENT DOCUMENTS 6,604,236 B1 * 8/2003 Draper ...................... G06F 8/66
717/170
6,886,016 B2 * 4/2005 Hansen et al.
(Continued)

OTHER PUBLICATIONS

Heman et al., "Positional Update Handling in Column Stores," SIGMOD' 10, Jun. 6-11, 2010; ACM 978-1-4503-0032-2/2/10/10, (Copyright 2010).
(Continued)

*Primary Examiner* — Jay A Morrison
*Assistant Examiner* — Ken Hoang
(74) *Attorney, Agent, or Firm* — Schwegman Lundberg & Woessner, P.A.

(57) ABSTRACT

A proposed modification to a record of a base data structure is identified, the records of the base data structure sorted by primary key. A type of modification of the proposed modification is identified. A record is added to a differential data structure of the type, the differential data structure record describing the proposed modification. A record is added to a delta data structure sorted by the primary key, the delta data structure record including the primary key value of the record, the type of the proposed modification, and a pointer to the record added to the differential data structure. Data can be fetched using the delta data structure to apply modifications to a set of records requested in the fetch and generate a modified set of records to be returned in a response to the request.

36 Claims, 15 Drawing Sheets

(56) References Cited

U.S. PATENT DOCUMENTS

| | | | | |
|---|---|---|---|---|
| 2006/0075004 A1* | 4/2006 | Stakutis | ............ | G06F 17/30067 |
| 2006/0106888 A1* | 5/2006 | Iida et al. | .................... | 707/203 |
| 2010/0235335 A1* | 9/2010 | Heman et al. | ................ | 707/703 |

OTHER PUBLICATIONS

Boncz, "The Story of vectorwise," Keynote DBA, CWI, University of Amsterdam, Rabat, Morocco, (Oct. 25, 2012).

Harizopoulos et al., "Column Oriented Database Systems," VLDB 2009 Tutorial, (2009).

Zukowski, "Balancing Vectorized Query Execution with Bandwidth-Optimized Storage," Uva-Dare, University of Amsterdam ISBN: 978-90-9024564-5; (2009).

Zukowski et al, "DSM vs NSM: CPU Performance Tradeoffs in Block-Oriented Query Processing," Proceedings of the Fourth International Workshop on Data Management on New Hardware (DaMoN 2008), (Jun. 13, 2008).

Cornacchia et al., "Flexible and Efficient IR Using Array Databases," The VLB Journal (2008) 17:151-168, Published 2007.

* cited by examiner

*400c*

Update T1 set C2 = 17 where C1 = 'G' → 485

BASE DATA 'T1' — 405

| C1 | C2 | C3 |
|---|---|---|
| A | 3 | Jone |
| C | 7 | Johnson |
| E | 5 | Jackson |
| G | 7 | James |
| ... | ... | ... |

DELTA STRUCTURE 'T1' — 410

| C1 | C2 | C3 | C4 |
|---|---|---|---|
| A | 0 | C3 | 0 |
| C | 1 | Delete | 0 |
| F | 3 | Insert | 1 |
| H | 4 | Insert | 0 |
|  |  |  |  |

478 ← → 480

INSERT TABLE — 415

| C1 | C2 | C3 |
|---|---|---|
| H | 4 | Johnson |
| F | 6 | Jenkins |

DELETE TABLE

| C1 |
|---|
| C |

482 — 420

C1 UPDATE TABLE — 425

| C1 |
|---|
|  |
|  |

C2 UPDATE TABLE — 430

| C1 |
|---|
|  |
|  |

C3 UPDATE TABLE — 435

| C1 |
|---|
| Jones |
|  |

BASE DATA — 405

| C1 | C2 | C3 |
|---|---|---|
| A | 3 | Jones |
| E | 5 | Jackson |
| F | 6 | Jenkins |
| G | 17 | James |
| H | 4 | Johnson |
| ... | ... | ... |

DELTA STRUCTURE — 410

| C1 | C2 | C3 | C4 |
|---|---|---|---|
| E | 1 | C2 | 0 |
| | | | |

610

INSERT TABLE — 415

| C1 | C2 | C3 |
|---|---|---|
| | | |
| | | |

DELETE TABLE

| C1 |
|---|
| |
| |

420

C1 UPDATE TABLE

| C1 |
|---|
| |
| |

425

C2 UPDATE TABLE

| C1 |
|---|
| 15 |
| |

615 — 430

C3 UPDATE TABLE

| C1 |
|---|
| |
| |

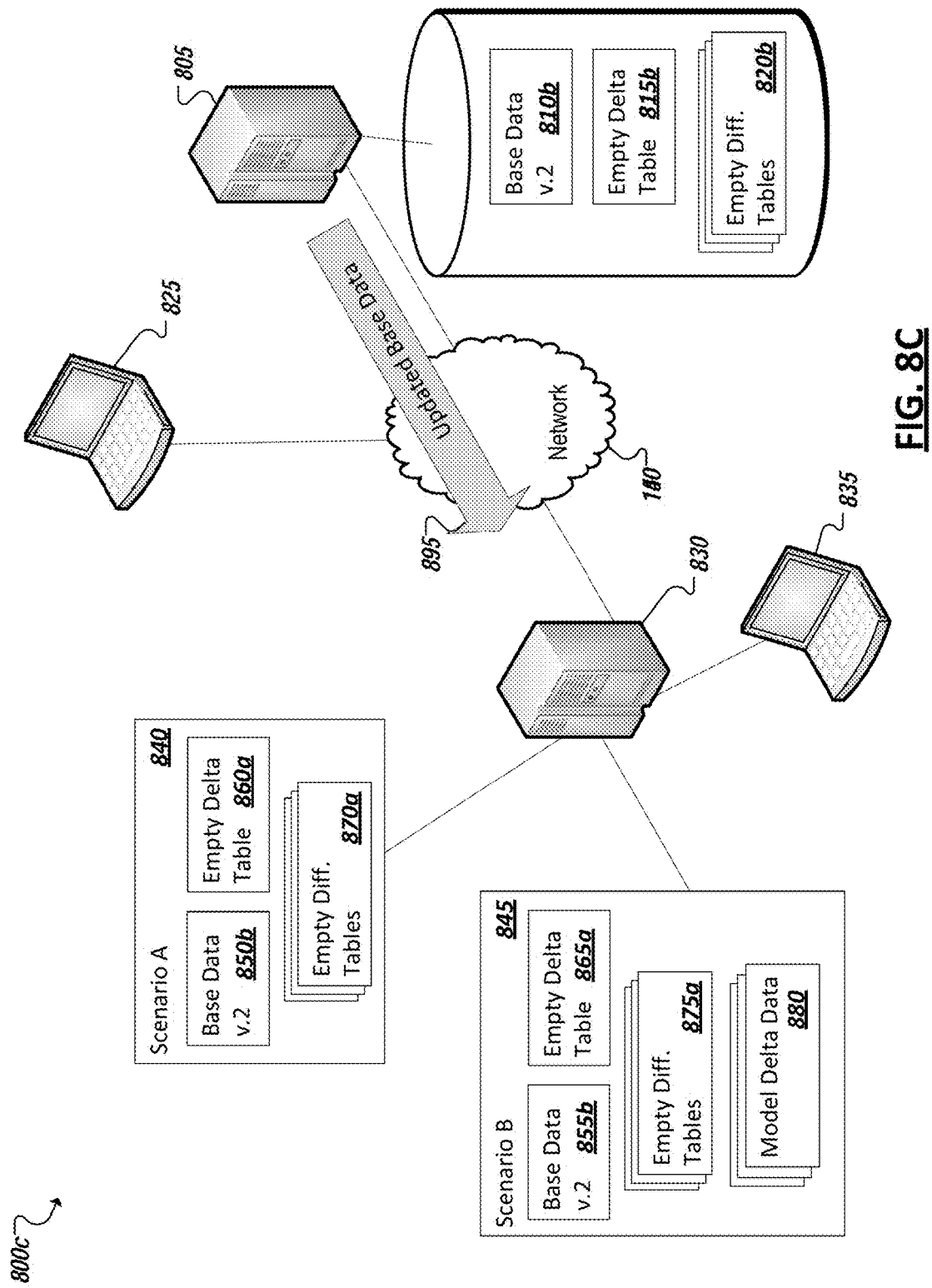

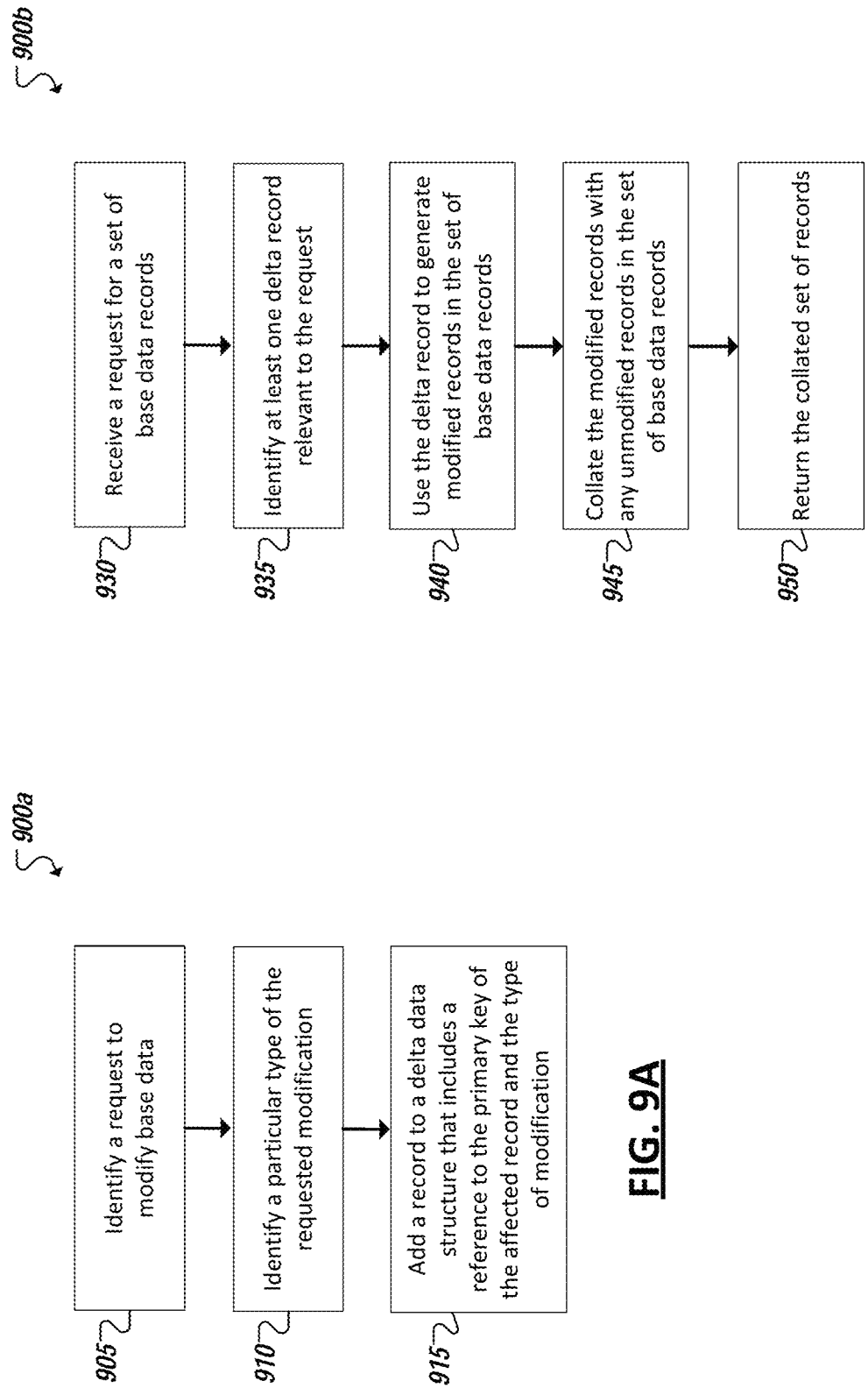

VALUE-BASED DIFFERENTIAL DATA

TECHNICAL FIELD

This disclosure relates in general to the field of data management and, more particularly, to managing changes to a data structure.

BACKGROUND

Modern systems and services demand high performance data management. Numerous database systems have been developed to handle ever growing volumes and uses of data. Column-oriented data base systems, or column stores, for instance, have seen a recent resurgence, particularly in performance-intensive use cases. More formally, a column-store can be defined as having one or more tables where each table is a collection of related columns of equal length, a tuple representing a single row within the table. Thus, tuples consist of values aligned in columns and can be retrieved from the set of table columns using a single row-id, or tuple, index value.

As compared with traditionally more popular conventional row-oriented database systems, column-stores can realize faster read requests of data with fewer disk input/output (I/O) operations per transaction. Column-stores can make use of a decomposed storage model (DSM) where data is persisted in column-oriented storage blocks, rather than row-oriented, or other storage blocks. As read requests can be implemented as scans of a (typically small) identified subset of columns in a table, fewer column block reads and corresponding disk I/O operations can be used to fulfill the read request (relative to overhead of using a row-based structure). On the other hand, column stores have been recognized as having higher costs than some other database systems when it comes to updating data. Consequently, recent implementations of column store systems tend to focus on read-only, or read-mostly optimized database applications such as data warehousing, data mining, and other application areas having a relatively high proportion of read-to-update requests.

In conventional implementations, a variety of design and operational techniques have been employed to attempt to enhance the read-oriented performance of column-store databases. For instance, column store databases can allow sorting, or ordering of column store tuples, to permit improvement of read-oriented performance. Through a defined sort ordering, tuples can be stored in a sort order according to a sequence of sorted attributes values corresponding to a specified sort key for the table. Scans of the sorted table can be restricted to a fraction of the disk blocks, proving particularly advantageous in cases where a scan query contains a range or logical predicates dependent on any prefix of the sort key attributes. Other conventionally employed techniques include data compression, clustering, and replication.

BRIEF DESCRIPTION OF DRAWINGS

FIGS. 4A-4D are simplified block diagrams representing example operations involving an example delta data structure;

FIGS. 6A-6B are simplified block diagrams representing example operations involving an example an example delta data structure;

FIGS. 8A-8C are simplified block diagrams representing example operations involving an example an example delta data structure;

FIGS. 9A-9B are flowcharts of example techniques for using an example delta data structure in accordance with at least some embodiments.

Like reference numbers and designations in the various drawings indicate like elements.

SUMMARY

Figure 1:
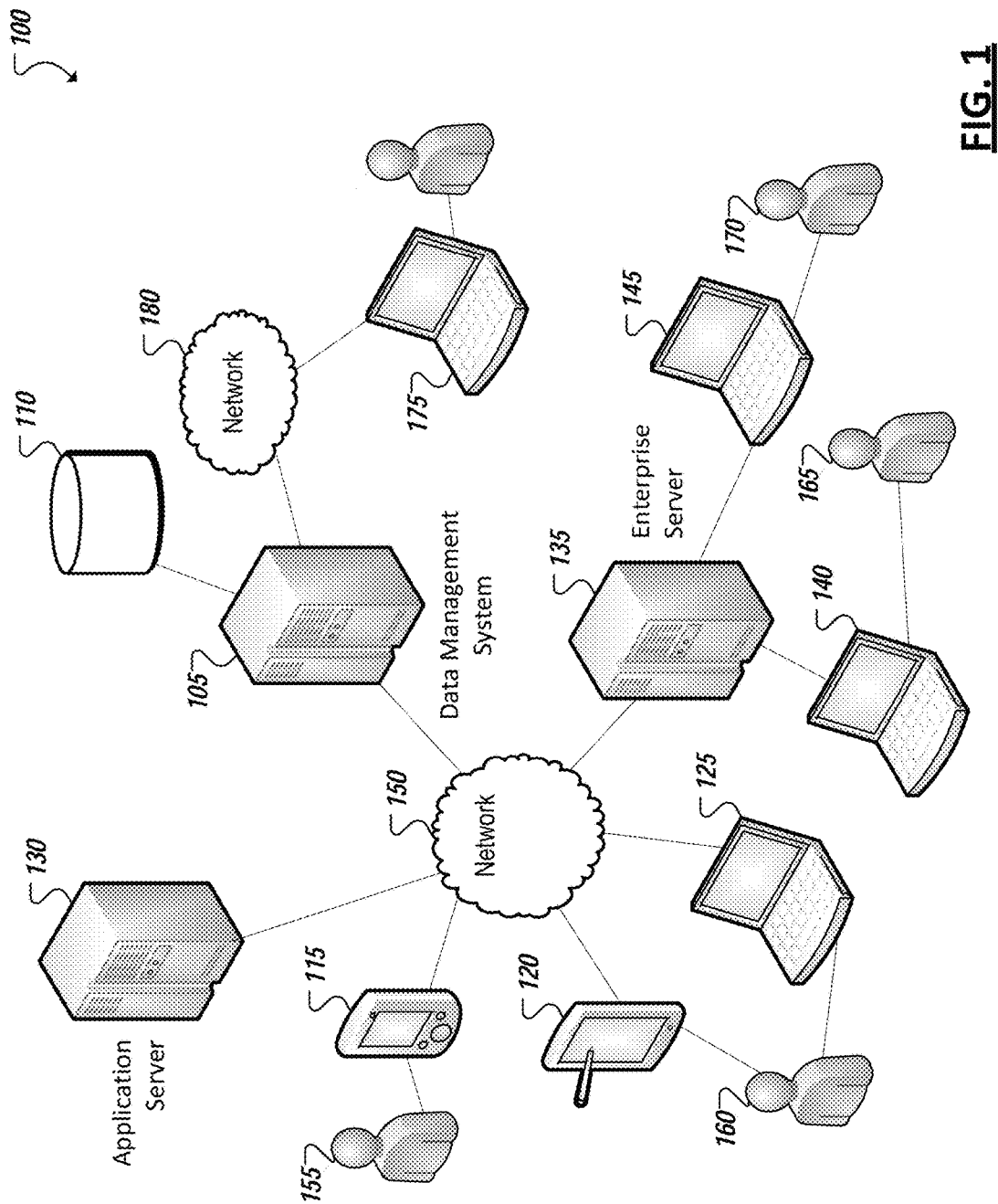
FIG. 1 is a simplified schematic diagram of an example computing system adapted to provide a delta structure for a data structure in accordance with at least some implementations.

In general, one aspect of the subject matter described in this specification can be embodied in methods that include the actions of identifying a proposed modification to at least one particular record of a base data structure including a plurality of records, the base data structure sorted by primary key of the plurality of records. A type of modification of the proposed modification can be identified. A record can be added to a differential data structure of the type, the differential data structure record describing the proposed modification. A record can be added to a delta data structure, the delta data structure sorted by the primary key and the delta data structure record including the primary key value of the record, the type of the proposed modification, and a pointer to the record added to the differential data structure.

Another general aspect of the subject matter described in this specification can be embodied in systems that include a processor device, memory element, and a modification engine. The modification engine can identify a proposed modification to at least one particular record of a base data structure, identify a type of modification, and add a record to the differential data structure of the type describing the proposed modification. The modification engine can further add a record to a delta data structure. The base data structure can be sorted by primary key of the plurality of records and the delta data structure can be sorted by the primary key and the delta data structure record can include the primary key value of the record, the type of the proposed modification, and a pointer to the record added to the differential data structure. In some instances, systems can further include a fetch engine adapted to receive a request for a set of records in the base data structure, determine that one or more of the set of records are referenced in the delta data structure, use the delta data structure to identify records in differential data structures describing a set of modifications affecting one or more of the set of records, apply the set of modifications to the set of records to generate a modified set of records, and return the modified set of records in a response to the request.

Another general aspect of the subject matter described in this specification can be embodied in methods that include the actions of receiving a request for a set of records, at least some of the set of records included in a base data structure. The base data structure can include a plurality of records and be sorted by primary key of the plurality of records. It can be determined that at least one of the set of records is referenced in a delta data structure, the delta data structure sorted by the primary key of the plurality of records and each record in the delta data structure including a pointer to a corresponding record in a differential data structure describing a respective modification in a set of modifications affecting one or more of the set of records. The delta data structure can be used to apply the set of modifications to the set of records and generate a modified set of records and the modified set of records can be returned in a response to the request.

Another general aspect of the subject matter described in this specification can be embodied in computer program products including a base data structure including a plurality of records, the base data structure is sorted by primary key of the plurality of records. The computer program products can further include a differential data structure including differential records, each differential record describing a modification made to the records of the base data structure, and additionally include a delta data structure including delta records, the delta data structure is sorted by the primary key and each delta record identifying a value of the primary key value of a respective modified base data record, a type of a corresponding modification of the respective modified base data record, and a pointer to a differential data structure record describing the corresponding modification.

These and other embodiments can each optionally include one or more of the following features. The differential data structure can be one of a set of differential data structures and each differential data structure in the set of differential data structures can correspond to a respective type of modification and describe modifications of the respective type. The particular type can be one of a set including insertion of a new record, updating a value of an existing record, and deleting an existing record, and the set of differential data structures can include at least one delete table, at least one update table, and at least one insert table. Each insert table can identify record values of the corresponding inserted record including a primary key value for the corresponding inserted record. Each update table can identify the primary key of the updated record and at least one updated value. The delta data structure can be a binary tree structure. Information can be merged from the differential data structure and the delta data structure into the base data structure to generate an updated base data structure sorted by the primary key. The updated base data structure can replace the base data structure. Differential data structures and the delta data structure used in the merging can be cleared. A second proposed modification to at least one record of the updated base data structure can be identified and a type of modification of the second modification can be identified. A particular record can be added to a cleared one of the differential data structures of the type of the second modification, and a particular record can be added to the cleared delta data structure, the particular record in the cleared delta data structure identifying a primary key value of the particular record, the type of the second modification, and a pointer to the particular record added to the cleared differential data structure. Merging can be performed according to a maintenance schedule for the base data structure. Additionally or alternatively, margining can be performed in response to detecting that a threshold number of records in the delta data structure has been met.

Further, these and other embodiments can also each optionally include one or more of the following features. The differential data structure and the delta data structure can be caused to be copied to a scenario including a copy of the base data structure. The differential data structure and delta data structure can be communicated to a system hosting the scenario over a network. A provisional modification to the base data structure can be identified and the provisional modification can be recorded in a provisional modification data structure. Recording the provisional modification can include identifying a particular type of modification of the provisional modification, adding a particular record to a provisional differential data structure corresponding to the particular type of the provisional modification, and adding a record to a provisional delta data structure, where the provisional delta data structure is sorted by the primary key and the provisional delta data structure record includes the primary key value of the particular record, the type of the provisional modification, and a pointer to the particular record added to the provisional differential data structure. The provisional modification can be caused to be applied to the base data structure. The delta data structure record can further include a location reference of the modified particular record in the base data structure.

Further, these and other embodiments can also each optionally include one or more of the following features. Generating the modified set of records can include using the delta data structure to generate modified records for each of the set of modifications, and collating, by the primary key, unmodified records of the set of records included in the base data structure with the modified records to generate a collated modified set of records. It can be determined whether a record in the delta data structure references an existing record in the set of records, and referenced existing records can be replaced with modified records generated from modification information in the differential data structure.

Further, these and other embodiments can also each optionally include one or more of the following features. The base data structure can be a first base data structure, the delta data structure can be a first delta data structure, and a second base data structure can be provided that is sorted by a second primary key, and a second delta data structure can be provided that is also sorted by the second primary key. The differential data structure can be one of a set of differential data structures capable of being pointed to by the delta data structure and each differential data structure in the set of differential data structures can correspond to a type of modification. The set of differential data structures can include an insert table, each record of the insert table describing a respective new record to be inserted into the base data structure. The set of differential data structures can include a delete table, each record of the delete table identifying a primary key of a record in the base data structure to be deleted. The set of differential data structures can include an update table, each record of the update table describing a modification of a value of a respective existing record in the base data structure. The update table can include a set of update tables and each update table in the set corresponds to modifications to values of a respective one of a set of rows of the base data structure. The set of differential data structures can further include each of an update table, a delete table and an insert table. Each delta record can further identify a location reference of the respective modified base data record. The delta data structure can be a binary tree data structure.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

DETAILED DESCRIPTION

Updates to data structures can impose performance penalties within a system. For instance, delays in implementing updates can result in errors and the return of stale data. Further, update operations can further result in blocking read attempts of the data. Additionally, some data structures, such as column stores can be particularly prone to update-related performance penalties. For instance, an example tuple update performed on a column store table with n columns can involve at least n block writes (i.e., as opposed to just one in a conventional row store table). Sorting a column store can impose still additional costs on a system, as corresponding updates are made to a sorted structure to maintain the integrity of the sort, among other examples. For instance, to improve query performance, column arrays can be sorted to order values of the primary key column. However, if a row is to be inserted within the table with primary key value between the first and last primary key values of rows in the table, then all the rows with a primary key value higher than the primary key of the inserted row will be shifted by one position to accommodate the new row. The running time (and relative delay) of such an insert operation, as an example, can be linear to the size of the base table.

A system can be provided to reduce the cost of modifications to a base table, among other potential advantages, such as the convenient management of versioning of a data structure. For instance, a delta structure can be provided and used to track modifications to the base table include inserts, updates, and deletes of rows and records within a table, tree, or other data structure (referred to collectively herein as "table"). For instance, a delta table can be maintained for a base table sorted by the primary key of the base table, where the delta table is also sorted according to the same primary key. Further, in some implementations, the delta table can contain or point to differential data tables describing the recorded modifications made to the base data. Fetches of records from the base table can then involve generating a collated set of data from the base table and corresponding delta table so as to capture the modifications made and recorded within the delta table. Further, modifications recorded within the delta table (and/or modification tables) can be merged as certain intervals to permanently update the base table with the modifications. Delta structures and differential data structures can be archived and cleared to record subsequent changes to the merged base data, thereby maintaining a relatively small table size for the delta table. Further, sorting the delta table by the primary key of the base table can further simplify merging of the delta tables with the base table at appropriate intervals.

FIG. 1 is a simplified block diagram illustrating an example implementation of a computing system 100 including a data management system 105 managing one or more data stores 110 of one or more databases or other data structures, including in-memory databases, on-disk databases, row-oriented data structures, column-oriented data structures, tables, binary trees (B-trees), and the like. The data stores 110 can include data stores (e.g., 110) local to or remote from data management system 105, including, for instance, cloud-based and distributed data stores, among other examples. In some implementations, data management system 105 can include (or operate in connection with) functionality for serving data included in data stores 110 to one or more client systems (e.g., 115, 120, 125, 130, 135, 140, 145) over one or more networks (e.g., 150). Such client systems can include personal computing devices (e.g., 115, 120, 125, 140, 145) permitting users (e.g., 155, 160, 165, 170) to make or initiate queries of and consume services making use of the data of data stores 105. Client systems can further include systems, such as application servers (e.g., 130, 135) that can consume data of data stores 110 in connection with services, applications, websites, and other resources hosted by the systems (e.g., 130, 135) for use by local users as well as for serving to other devices (e.g., 115, 120, 125, 140, 145) and remote users, over one or more networks (e.g., 150).

Client systems (e.g., 115, 120, 125, 130, 135, 140, 145), for instance, in connection with their interactions involving data of data stores 110 can make, request, or otherwise cause modifications to the data of data stores 110. Further, local computing systems (e.g., 170), for instance, over local area or private networks 175 of data management system 105, can also permit modification to data of data stores 110 (e.g., by administrator users 180), among other examples. Data modifications can include the insertion of new records, changes or updates to existing records, deletion of existing records, etc. Data management system 105 can manage such modifications, including the use and management of delta data structures in recording these modifications as well as fetch requests involving modified data records of data store 110. In some implementations, tracking and management of modifications to the data of data stores 110 can further involve the management and use of data modification tables by data management system 105 according to principles described herein. In this manner, data management system 105 can manage original base data (i.e., the base data prior to a round of attempted modifications) separate from the changes to the base data. Data management system 105 can further manage fetch requests of modified data, including the assembly of data from delta data structures, data modification structures, and base data responsive to fetch requests (e.g., of client systems 115, 120, 125, 130, 135, 140, 145), among other examples.

In general, "servers," "systems," "clients," and "computing devices," including the servers, client systems, and other computing devices in example system 100 (e.g., 105, 110, 115, 120, 125, 130, 135, 145, 170, etc.), can include electronic computing devices operable to receive, transmit, process, store, or manage data and information associated with computing system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, and computing devices (e.g., 105, 110, 115, 120, 125, 130, 135, 145, 170, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services making use of data managed by data management system 105, among other examples. Further, in some implementations, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User, personal, or endpoint computing systems (e.g., 115, 120, 125, 140, 145, 175, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 150, 180). Attributes of user computing devices, and computing device generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices can further include at least one graphical display device and user interfaces allowing a user to view and interact with graphical user interfaces of applications and other programs provided in system 100, including user interfaces and graphical representations of data managed by data management system 105 (e.g., stored in data stores 110) as well as programs, services, models, and other resources making use of such data. Moreover, while user computing devices may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
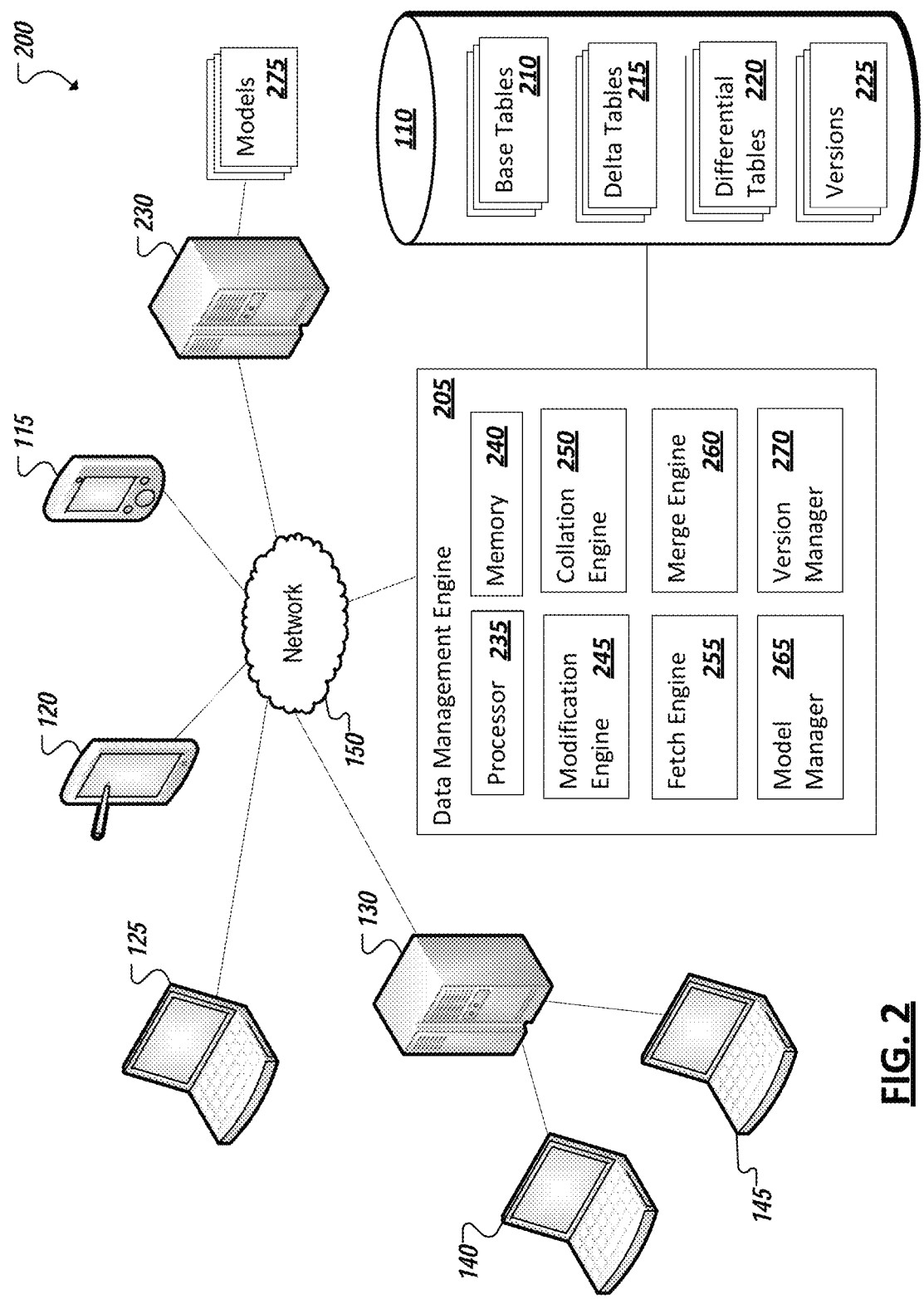
FIG. 2 is a simplified block diagram of an example system including an example data management engine.

Turning to FIG. 2, a simplified block diagram is shown of an example system 200 including an example data management engine 205 (e.g., of a data management system (e.g., 105)). In some example implementations, a data management engine 205 can manage data of data structures 210, 215, 220, 225 maintained in one or more data stores 110. Moreover, the example system 200 can further include one or more additional computing devices, systems, and software-based tools (e.g., 115, 120, 125, 130, 140, 145, 230, etc.) capable of communicating with data management system 205, for instance, over one or more networks (e.g., 150), and accessing data of data store 110.

In one example implementation, a data management engine 205 can include one or more processors (e.g., 230) and memory elements (e.g., 235), as well as one or more software- and/or hardware-implemented components and tools embodying functionality of the data management engine 205. In some examples, a data management engine 205 can include, for instance, such components and functionality as a modification engine 245, collation engine 250, fetch engine 255, merge engine 260, model manager 265, and version manager 270 among potentially other components, modules, and functionality, including combinations of functionality and tools described herein. In addition, in some implementations, a data management system 205 can manage data structures such as one or more base data tables 210 storing base data managed by the data management system 205, one or more delta data structures 215, differential data tables 220, and versioning data 225 among potentially other examples.

In one example implementation, a data modification engine 245 can manage the delta data structures (e.g., 215) and any accompanying differential data tables (e.g., 220) in connection with the management of modifications to base data in base data tables 210. For instance, a data modification engine 245 can handle requests (e.g., of other devices (e.g., 115, 120, 125, 130, 140, 145, 230, etc.) in system 200) to make changes to base data of certain base tables 210. The data modification engine 245 can identify the changes and record the changes in the delta data structure corresponding to the modified base data table, as well as, in some instances, one or more differential data tables 220. In some instances, the changes can be recorded in the delta data structure 215, while in other instances, the specific changes can be recorded in the differential data tables 220 with the delta data structure 215 pointing or linking to the corresponding records of the differential data tables 220 including the description of the modification, among other example implementations.

An example collation engine 250 can be used to combine and collate sorted data from the base table 210 and delta data structures 215 (and differential data tables 220) to generate collated data that incorporates modifications made to the base data. In some instances, a range or selection of a set of records in base tables 210 can be identified and collation engine 250 (or another component of data management engine 205) can identify whether records exist in delta data structure 215 indicating modifications made to the selected records. An example collation engine 250 can identify, from corresponding records delta data structure 215, what modifications, updates, insertions, and deletions have been made that affect the set of records and implement these changes by overlaying (e.g., inserting, replacing, or deleting) modified data records on the corresponding base data records and collate the overlaid records to preserve the sorting of the base data. In instances where differential data tables 220 are used, collation engine 250 can further identify, from the delta data structure, modifications recorded in differential data table 220 records and collate and overlay these changes on the corresponding base data. This collated data processed using the collation engine 250 can then be returned, for instance, in connection with providing a response to a fetch request (e.g., using an example fetch engine 255), or generating a new version of the base data that incorporates the modifications recorded in the delta data structure.

In some implementations, a fetch engine 255 can be provided with functionality for managing requests to fetch data and manage the development of responses by the data management system 205 (e.g., using collation engine 250) to the fetch requests. In some implementations, a fetch engine can accept a request to fetch data from the base data and identify which base tables 210 and records in the base data are relevant to the request. Further, the fetch engine 255 can operate cooperatively with collation engine 250 to identify records responsive to the fetch request, including modified records described in delta data. Indeed, fetch engine 255 can obtain collated data from collation engine 250 in response to a fetch request, the collated data including a collated set of response data from the base data and delta data (i.e., of delta data structure 215 and differential data tables 220). The fetch engine 255 can further coordinate delivery of the collated data to the requester by the data management engine 205.

In can be advantageous, in some instances, to manage the size of the delta data structures 215 used by the data management engine 205 so that updates of the delta data structures 215 (and/or differential data tables 220) do not become too expensive (e.g., as maintaining sorting of the delta data structure becomes more costly as the size of the data structure increases). A merge engine 260 can periodically perform merges of differential data with the base data to create new instances of the base table 210 that reflect modifications recorded in the delta data structure 215 (and differential data table 220). For instance, the merge engine 260 can copy data from the original base table 210 into the new instance of the base table and modify the new table by merging all the modifications recorded in the delta data structure and differential data tables 220 in the new base table. The original base data table can then be replaced by the new base table (e.g., by replacing the entirety of the original base data table with the new base data table or replacing affected portions or individual records of the original base table with corresponding portions of the new base table, etc.). Merges, such as truple merges, can further result in the clearing of the delta data structure 215 (and, in some cases, also the differential data tables 220) as information from the data structures 215, 220 is merged with the base data. Further, such merges can take place according to particular schedules to assist in managing the size of the delta data structure, such as during periods of low traffic (e.g., low volumes of fetch requests), at particular defined time intervals, or when the delta data structure 215 meets or exceeds a particular size threshold, among other examples.

A model manager 265 can be used to assist in the development and maintenance of data models (e.g., 275) based on or incorporating the base data (e.g., 210) and utilized by one or more systems (e.g., 230). Such models 275 can include provisional change data, scenarios, hypothetical data, test data, and the like. Models 275 can reference, incorporate, link to, or otherwise be based on base data. In some cases, models 275 may be reliant on the accuracy or current status of the base data and a model manager 265 can be used to assist in generating or updating models (e.g., 275) to incorporate the latest data modifications recorded in delta data structures 215 and differential data tables 220. Model manager 265 can identify models that are dependent on base data, including the portion of the base data upon which the model is dependent. Model manager 265 can further manage how, and to what extent, the models (e.g., 275) are to be updated and synchronized to the modifications (and merges) made to the base data, among other examples. For example, creation of a model, by the model manager or an outside system (e.g., 230), can cause a copy of the corresponding base table (e.g., 210), delta table (e.g., 215), and differential data tables (e.g., 220) to ensure that the most current version of the base data, along with recent modifications to the base data, is incorporated in the model, among other examples. Updates can also be communicated for use in updating copies of base data utilized by some of the existing models (e.g., 275). For instance, this can include the communicating, over one or more networks (e.g., 150), copies of updated base data and/or differential data to one or more client systems (e.g., 230) hosting, controlling, or otherwise managing the models (e.g., 275), among other examples.

A version manager 270 can be included in some implementations of a data management engine 205 for use in generating and managing versioning data 225 memorializing historical changes to base tables 210. Versioning data 225 can be based on or generated from delta data structures 215 and differential data tables 220 maintained by the data management engine 205. For instance, versioning data 225 can include copies of delta data structures 215 and differential data tables 220 developed during a relevant period corresponding to a version of the base data. For example, prior to refreshing delta data structures 215 and differential data tables 220 (e.g., during a truple merge), a copy of the delta data structures 215 and differential data tables 220 can be made and included in versioning data 225. In other instances, the copies of the delta data structures 215 and differential data tables 220 can be associated with particular versions of the data and can be further used to re-build a version of the base data through a merge of the delta data structures 215 and differential data tables 220 with the previous version of the base data. For instance, at each merge resulting in a new set of base data, a version copy can be created and stored in versioning data 225. For instance, copies of a version of a base data table, prior to a merge, can be archived and included in versioning data 225 prior to the pre-merge base data being replaced with a merged base data set. In other instances, rather than multiple copies of base data, different versions of the base data can be archived (and potentially re-built) by aggregating and merging copies of corresponding and preceding delta data structures 215 and differential data tables 220, among other examples. The version manager 270 can further provide and manage read access of the versioning data in connection with the data management system 205 to one or more authorized client systems (e.g., 115, 120, 125, 130, 140, 145, 230, etc.), among other examples and functionality.

Figure 3:
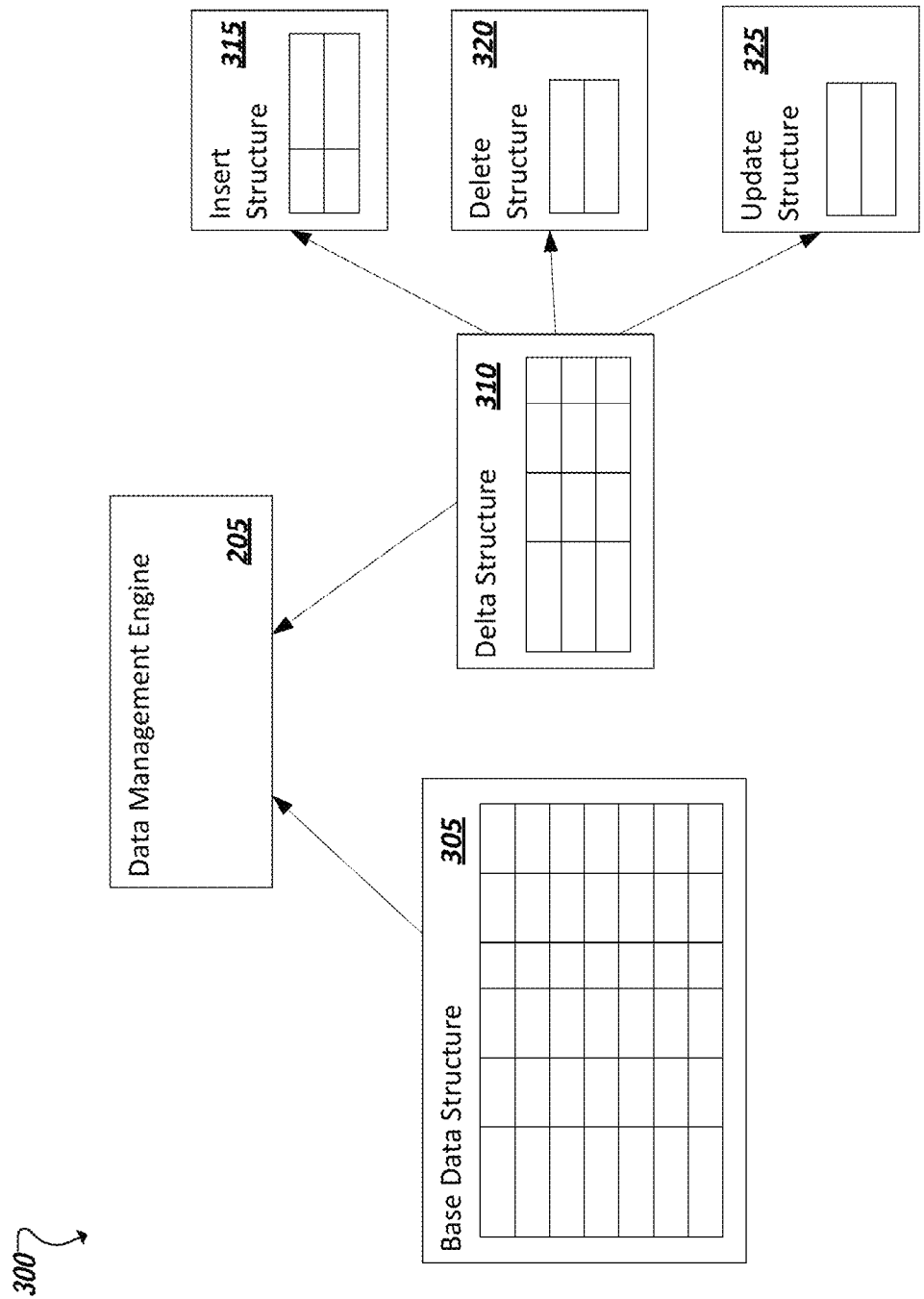
FIG. 3 is a simplified block diagram representing example data structures including a delta data structure.

Turning to FIG. 3, a simplified block diagram 300 is shown illustrating example data structures managed by an example data management engine 205. In one particular implementation, a base data structure 305, such as a database table, B-tree, or other sortable data structure, can be provided that stores at least a portion of the base data of a system. A database or data store can include multiple base data structures (e.g., 305) in some implementations. Each base data structure (e.g., 305) can store records, or data entities, and each record can have a unique identifier, or primary key. The primary key can include one or more columns of the record. The base data structure can be sorted by value of the primary key of each record. Further, a delta data structure 310 can be provided that is also accessible to the data management engine 205. In some instances, delta data structure 310 can be a B-tree. The delta data structure 310 can be associated with the base data structure 305. In some implementations, a one-to-one relationship can be provided between delta data structures (e.g., 310) and base data structures (e.g., 305), with each base data structure (e.g., 305) have a corresponding delta data structure (e.g., 310). Further, a sorted base data structure 305, sorted by a primary key, can have a corresponding delta data structure also sorted by the same primary key, simplifying both the use of the base data structure 305 as well as the delta data structure 310.

In some implementations, delta data structures can include the differential data describing fully how base data has been modified by a particular, corresponding modification recorded in the delta data structure. In other instances, delta data structures (e.g., 310) can point to differential data structures (e.g., 315, 320, 325) describing the actual modifications in more detail. For instance, in one example, differential data structures can include a set of data structures, each corresponding to a particular type of modification. For instance, an insert structure 315 can be provided for describing record, row, or truple insertions in a base data structure 305. Further, a delete data structure 320 can be provided for recording deletions of records and rows in the base data structure 305, and one or more update structures 325 can be provided for describing changes to values of existing records in base data structure 305. Indeed, in some implementations, a separate instance of an update data structure 325 can be provided for updates to each column in a base data structure 305 (excluding the primary key). For instance, a base data structure 305 having three columns in addition to its primary key can have three, corresponding update data structures 325, each corresponding to a respective one of the three columns, among other potential examples and implementations.

A data management engine 205, as described above, can build collated data sets generated from the base data structure 305, delta data structure 310, and differential data structures 315, 320, 325 to return data sets that include modifications to the base data (of base data structure 305) recorded in the delta data structure 310, and differential data structures 315, 320, 325. Further, at least the delta data structure can be considerably (sometimes exponentially) smaller in size than the base data structure 305, which allows for the delta data structure to be a significantly more efficient location for recording real time changes to the base data (and recording these changes in sorted format) while preserving the ability to still capture these modifications when responding to fetch requests of the base data.

Figure 4A:
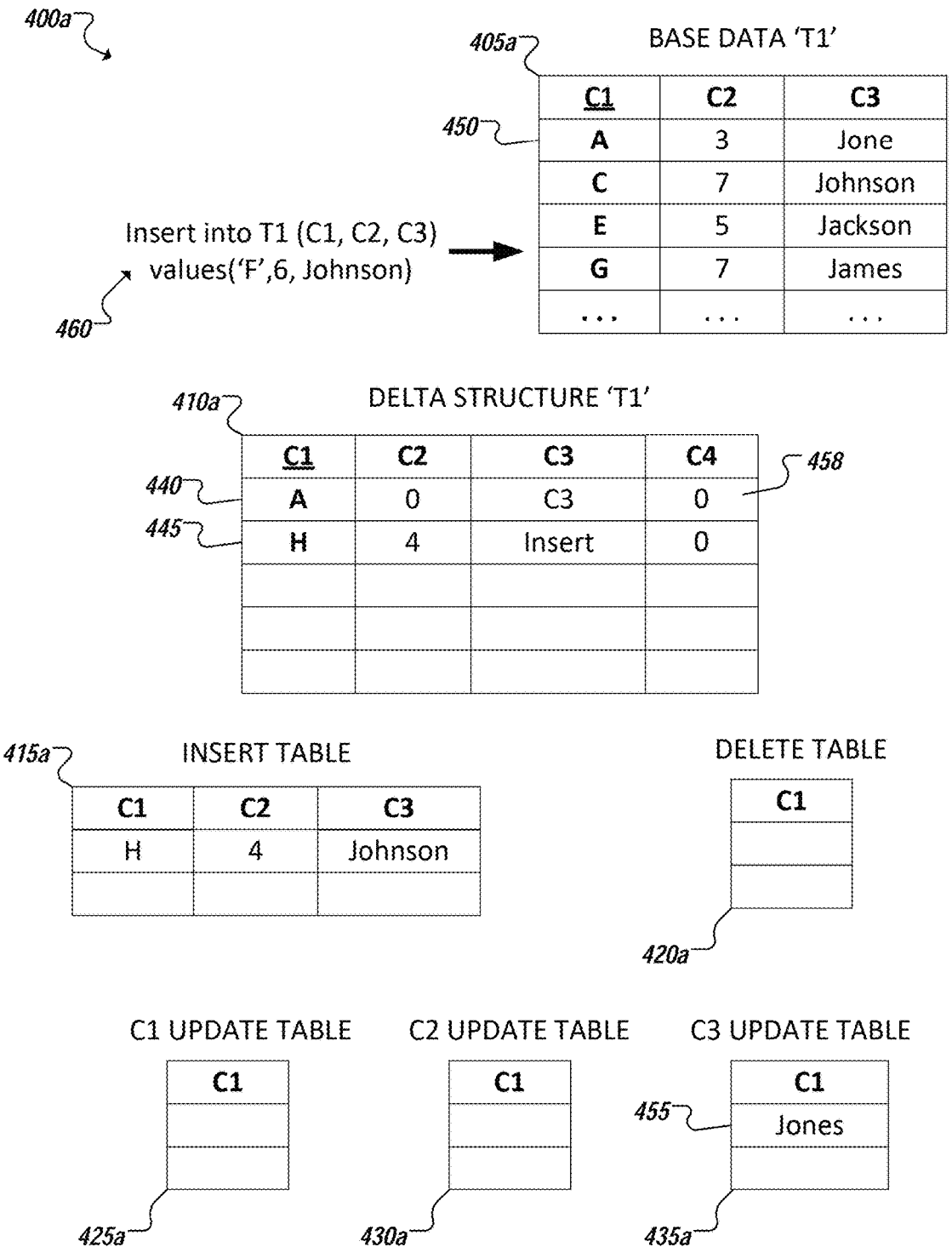

Turning to the examples of FIGS. 4A-4D, simplified block diagrams 400a-d are shown illustrating the use of example base data structures, delta data structures, and differential data structures in accordance with some example implementations of a data management system. For instance, in the example of FIG. 4A, base data table T1 (405) is provided with three columns. The base data table T1 405 is sorted by a primary key in column C1 of the table T1. Further, a corresponding delta data structure 410, such as a B-tree, is provided that is also sorted by the same primary key (i.e., column C1 of the delta data structure 410). In the example of FIG. 4A, some modifications have already been made to the base data, as reflected in the first two records 440, 445 of the delta data structure 410. Each of the delta structure records (e.g., 440, 445) can point to corresponding differential data records (e.g., of differential data tables 415, 420, 425, 430, 435). For instance, delta structure record 440 can indicate a modification to base data with primary key A. The delta data structure can indicate the primary key of the base data that is affected (or being added), the location of the modification within the base data, the type of modification made to the base data, and a pointer to the corresponding differential data. In this particular example implementation, record 440 of delta data structure 410 indicates the primary key (in column C1 of the delta data structure 410), the location of the record within the base data (in column C2 in delta data structure 410 (e.g., as record 450 with primary key A is the first record, or record "0", in table T1)), the type of modification (e.g., that the modification is a change to the value in column C3 of the base data (i.e., column C3 of table T1) (e.g., as indicated in column C3 of the delta data structure 410)), and further point to a record (e.g., 455) in a differential data table (e.g., 435) corresponding to the particular modification and its modification type. In this example, the pointer (e.g., 458) can indicate the location (e.g., row or record "0" (i.e., the first row or record)) of the differential data within the corresponding differential data table 435 corresponding to updates of column C3 values. Accordingly, the record 450 in differential data table 435 can indicate the change made to the value of column C3 in record 450, namely correcting the spelling of a name entry from "Done" to "Jones."

Figure 4B:
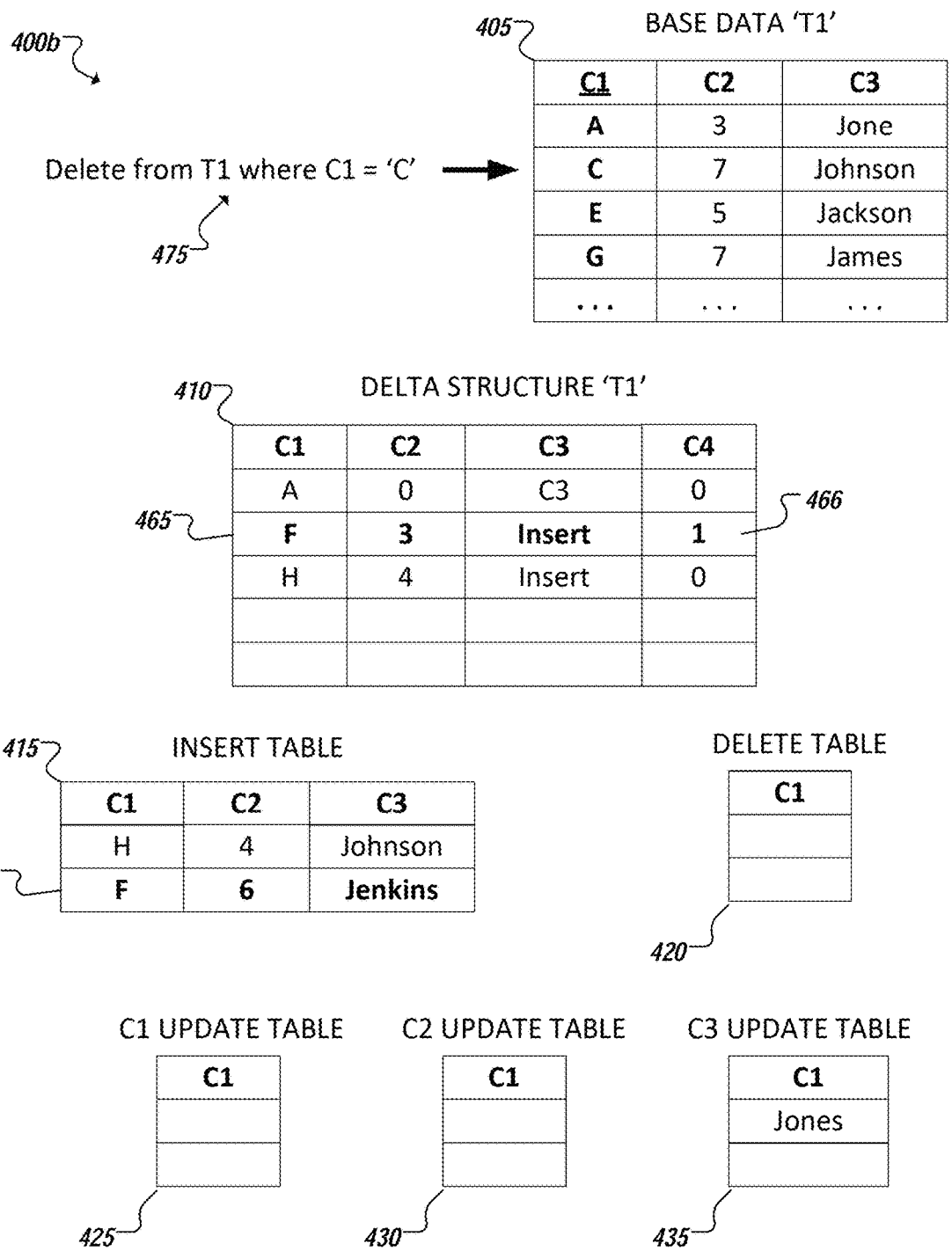

Continuing with the example of FIG. 4A, a new modification (e.g., 460) can be made to the base data prior to the previous modifications (e.g., recorded in delta data structure 410, and differential data structures 415, 420, 425, 430, 435) being merged with the base data in table T1 (405). For instance, a modification 460 can be requested or made to insert a new record into sorted table T1 with values C1="F", C2="6", and C3="Johnson". Turning to FIG. 4B, the modification 460 can cause a new record 465 to be added to the delta data table 410. As shown in the example of FIG. 4B, the new delta record 465 can be inserted into the delta data structure so as to maintain the sorting by primary key. As delta data structures (e.g., 410) can be considerably smaller than the base data structures (e.g., 405) to which they correspond, such inserts can be an exponentially cheaper operation than inserting the new record into the base table.

Continuing with the example of FIG. 4B, new delta record 465 entered in response to a modification 460 can include values including the primary key (e.g., "F") of the modified (i.e., inserted) record, the location of the record within the base table (e.g., the location within the base table T1 prior to merging any of the outstanding modification recorded in the delta data structure and differential data), an indication that the modification is an insertion of a new record, and a pointer 466 to the differential data corresponding to the type of modification (e.g., an Insert, recorded in insert table 415). In this specific example, because the insertion (e.g., at 460) is the second insertion to have been documented in delta data structure 410 and insert table 415, the pointer value 466 indicates that the differential data has been recorded in the second record of the insert table, or record "1". Further, an example insert table (e.g., 415) can be provided with columns corresponding to the columns of its corresponding base data table (e.g., 405), in this example having three columns corresponding to the columns of base table T1. Further, a record 470 can be added to the insert table 415 including the values of the inserted record.

Further modifications can be made to the base data. For instance, in FIG. 4B a delete request 475 is received, requesting deletion of the record(s) with primary key "C". Turning to FIG. 4C, the deletion request 475 in the example of FIG. 4B, can cause a new delta record 478 to be entered in the delta data structure, the new delta record 478, again, entered in the delta data structure 410 to retain sorting of the delta data structure 410. Delta record 478 can identify the primary key of the affected record, location of the modification within the base structure T1, and a pointer 480 to a record (e.g., 482) within a delete differential data structure (e.g., 420) that includes information concerning the deletion request 475. In some alternative implementations, delta records for delete requests may forego a pointer as well as a delete differential data structure (e.g., 420), as the records to be deleted can be identified directly from the delta data structure record 478 (e.g., in column C1).

Figure 4D:
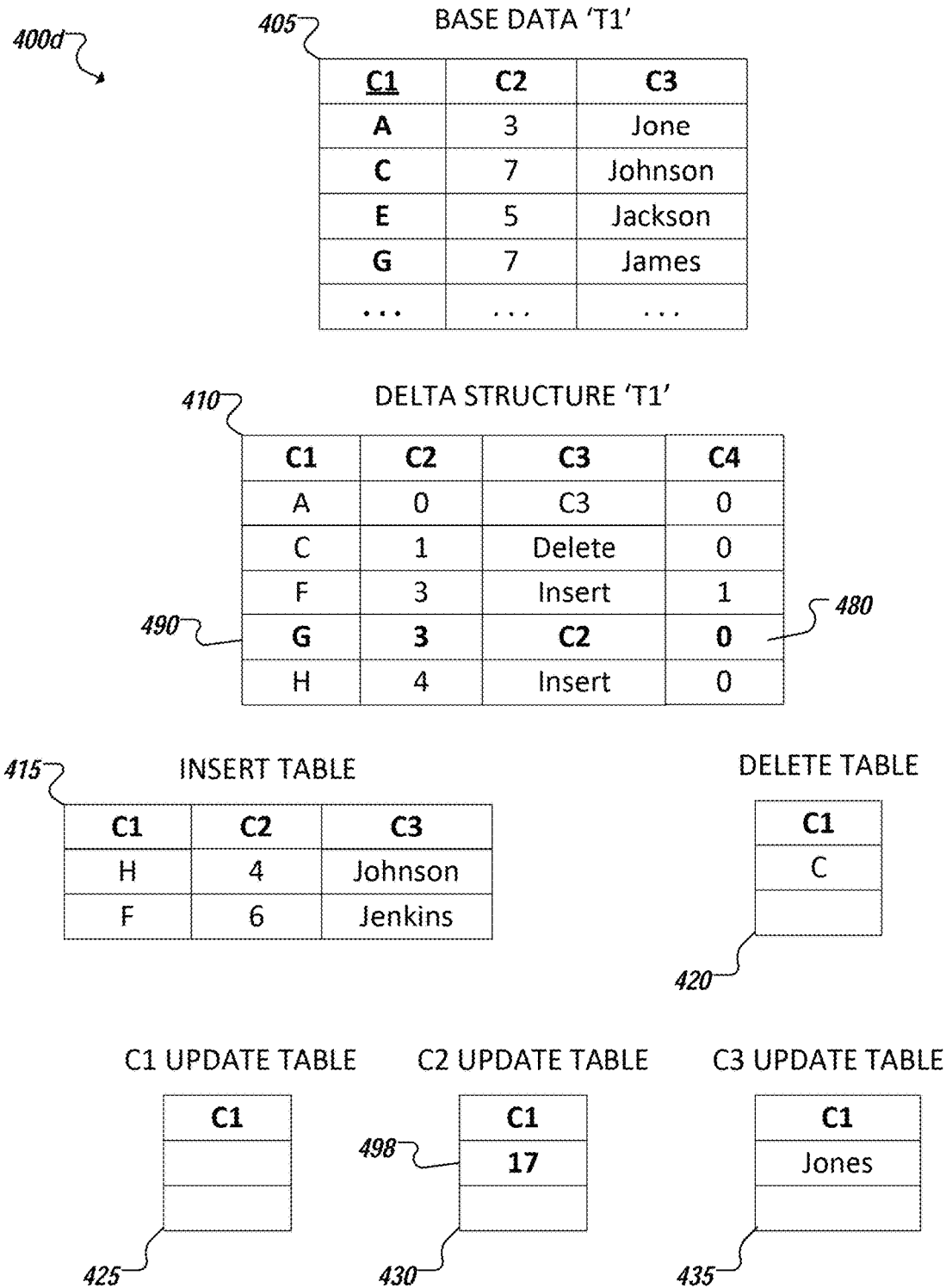

Continuing with the example of FIG. 4C, modification requests can also include requests to modify one or more columns of a base data record. For instance, a request 485 can be received to modify the value of column C2 to "17" in a record having a primary key (C1) value of "G". Turning to FIG. 4D, the modification 485 can cause an additional record 490 to be added to delta data table 410 describing the modification including the primary key "G" of the affected record, the position of the affected record in the base table, the type of modification (an update of column C2 of the base data table T1 405), as well as a pointer to a corresponding differential data structure for update modifications. In one example, a respective differential data structure (e.g., 425, 430, 435) can be maintained for corresponding updates to any one of the columns (e.g., C1, C2, C3) of the base table T1 405. In other implementations, a single differential data structure can be maintained for all updates to existing column values. In one instance, a single update differential data structure can include columns indicating both the column that is updated as well as the modified value to be applied to the respective record column, among other examples.

In the examples of FIGS. 4A-4D, three differential data structure 425, 430, 435 are maintained, each corresponding to updates to a respective column (e.g., C1, C2, C3) of the base table T1 405. In FIG. 4D, the added delta record 490 can point (at 495) to a record 498 (e.g., the first record "0") in a differential data table 430 corresponding to updates of column C2 of table T1. The pointer 495 can reference a first record "0" (498) in the differential data table 430 when the record 498 is the first to be added to the differential data table 430 (e.g., following a merge, etc.).

Figure 5:
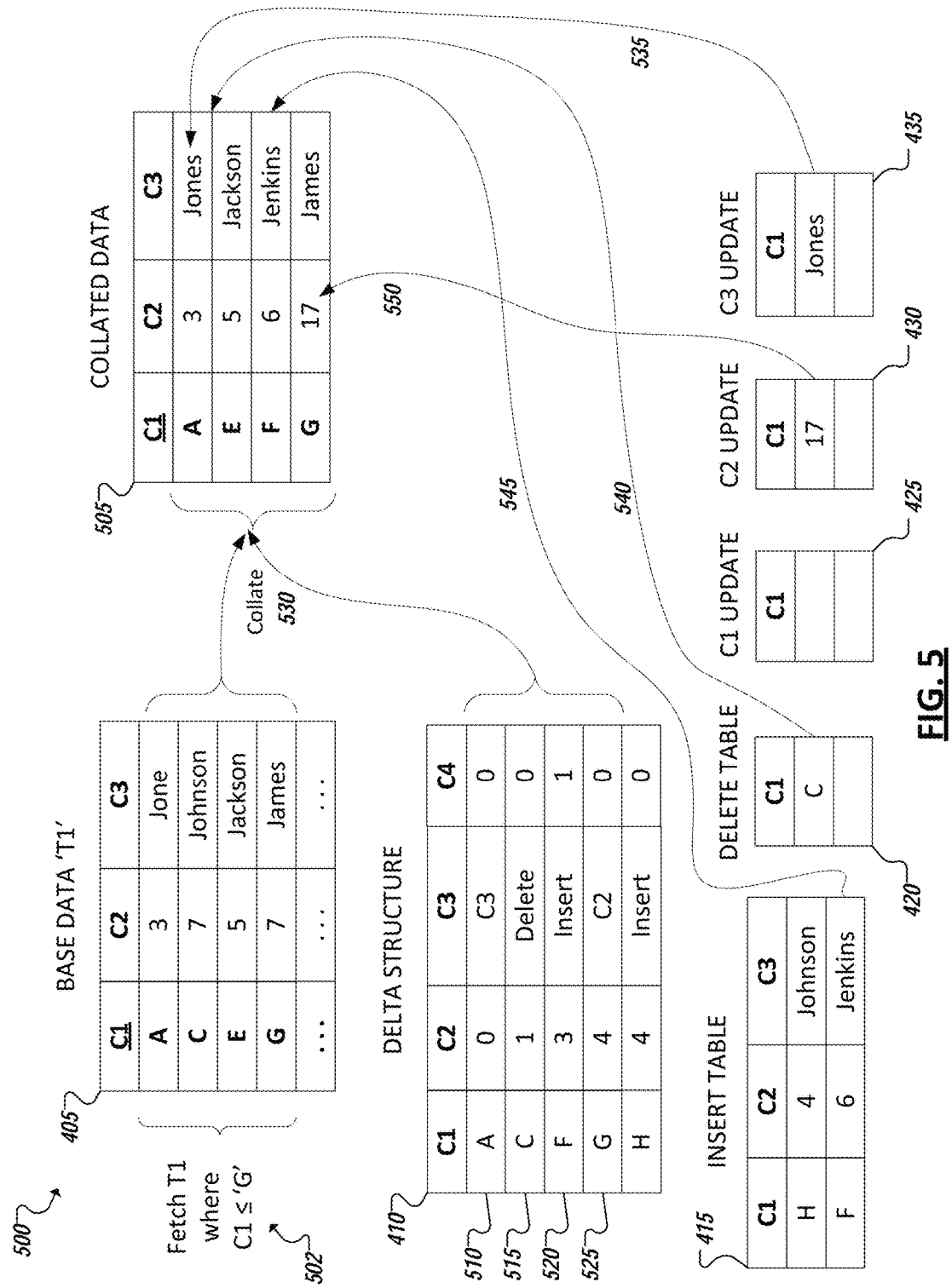
FIG. 5 is a simplified block diagram representing example operations involving an example delta data structure.

Turning to the example of FIG. 5, a simplified block diagram 500 is shown illustrating the base table T1 405, delta data table 410, and differential data tables 415, 420, 425, 430, 435 following the example modifications of the examples of FIGS. 4A-4D. A fetch request 502 can be received calling for one or more records to be retrieved from the base data. In this example, a fetch request 502 requests a range of records, such as a range of all records with primary key values up to "G" (i.e., "A" through "G"). Were the fetch request to simply retrieve the data from the base data table T1 405, the fetched results would not include the modifications made to the base data recorded in delta data table 410. In some implementations, the delta data structure 410 can be consulted in connection with the fetch request 502 to build a set of data responsive to the fetch request 502 that includes the modifications to the base data recorded in the delta data structure 410 corresponding to the base data.

As an illustrative example, in response to receiving the fetch request 502, one or more base data tables (e.g., 405) can be identified that include data relevant to the fetch request 502. Further, one or more corresponding delta data tables (e.g., 410) can be identified, for instance, in response to identifying the relevant base data tables. A collated set of data 505 can then be constructed from the base data table 405 and delta data structure 410 (and differential data (e.g., of differential data structures 415, 420, 425, 430, 435). In one example implementation, collated data 505 can be assembled by identifying the set of records in base data relevant to the fetch request 502 as well as the set of records in the delta data structure 410 relevant to the fetch request 502 (e.g., base data records or delta records with primary key values between "A" and "G"). These selected data records can be copied and the delta records can be processed according to the sorting of the selected data records. For instance, it can be identified that primary keys of one or more of the selected delta records (e.g., 510, 515, 525) match the primary keys of one or more of the selected base data records. Further, other delta records (e.g., 530) can be identified that correspond to the fetch request 502 but have primary keys that do not match the selected base data records, among other examples.

In one example, illustrated in FIG. 5, delta record 510 can be identified that corresponds to a selected base data record with primary key "A". The delta record 510 can then be read to identify the type of modification that has been made to the corresponding base data record (e.g., an update of the column C3 value) as well as a pointer to the corresponding record in differential data table 435. Accordingly, the copy of the selected base data can be modified according to the modification recorded in the delta record and differential data table (e.g., to change "Done" to "Jones"). A similar operation can be performed (e.g., 550) to incorporate the change recorded in delta record 525 to the base data with primary key "G". In other example, a delta record 515 can be identified that applies to base data with primary key "C", causing the deletion 540 of the base data record from the base data copy. Further, a delta record 520 can be identified that causes the insertion 545 of a new record (constructed from a corresponding record in insert table 415) into the copy of the selected base data records to complete construction of the collated data set 505 responsive to fetch request 502. Other techniques can also, or alternatively, be employed to generate modified data records from delta records and differential data records and collate these modified records with selected base data records to construct a collated data set 505 that retains the sorting of the original base data.

In some implementations, after (or even during) fielding and processing of a fetch request 502, additional modifications to the base data can be received (e.g., as in the examples of FIGS. 4A-4D) that can be added to the delta data structure and differential data tables (and even the collated data when relevant and prior to the collated data being returned to the requester). Further, immediately following a merge of the modification information from delta data structure 410 and differential data structures 415, 420, 425, 430, 435 with base data table 405, a fetch request 502 may result in the same collated data set 505, albeit where all records in the collated data 505 are pulled directly from the base data table itself.

Figure 6A:
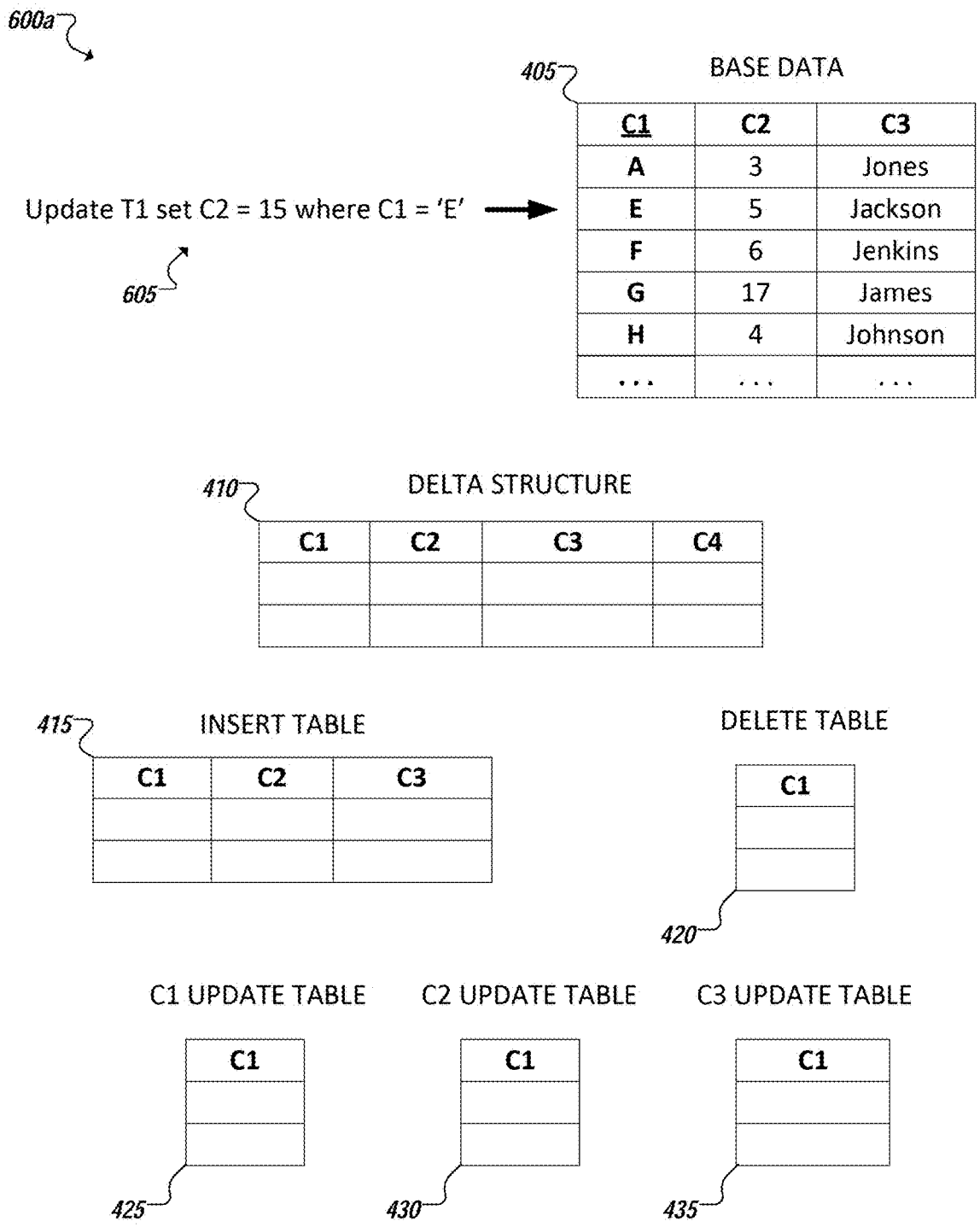

Turning to the example of FIG. 6A, a simplified block diagram 600a is shown illustrating the state of the base data structure 405, delta data structure 410 and differential data structures 415, 420, 425, 430, 435 following a merge, such as a triple merge, of the modification information from delta data structure 410 and differential data structures 415, 420, 425, 430, 435 with base data table 405 represented in FIGS. 4D and 5. As shown in FIG. 6A, changes documented in the delta data structure 410 and differential data structures 415, 420, 425, 430, 435 represented in FIGS. 4D and 5 have been transferred to and merged with the base data table 405. Further, following a merge, delta data structure 410 and differential data structures 415, 420, 425, 430, 435 can be cleared, in some instances, to control the size of at least the delta data structure 410 and thereby also control the costs of updating and using the delta data structure in connection with modifications of the base data. Indeed, as shown in the example of FIG. 6A, following a merge and clearing of the delta data structure 410 and differential data structures 415, 420, 425, 430, 435 with base data table 405, additional modification requests (e.g., 605) can begin the repopulating of delta data structure 410 and differential data structures 415, 420, 425, 430, 435 with the latest modifications to the base data.

In the example of FIG. 6A, a modification request 605 can request the updating of records in recently-merged base data table T1, requesting that a record with primary key "E", have the value of column C2 set to "15". As shown in the simplified block diagram 600b of FIG. 6B, a new record 610 in delta data structure 410 is created indicating a change to column C2 values to records with primary key "E" (in location "1" of the base data table T1) and a pointer to a differential data structure (e.g., 430) record 615 corresponding to changes to column C2 values of base data table T1. Additional delta records and differential data can be further added and these records can also be used in connection with fielding subsequent fetch requests of the base data (as in the example of FIG. 5) and can themselves be later merged with the base data table T1 (e.g., during a maintenance window or according to another schedule for the base data, among other examples).

It should be appreciated that the examples above are but some of the potential example implementations of the principles described herein. For instance, base data structures can vary is size, dimensions, type, and content. Accordingly, corresponding delta data structures and differential data structures can be attuned to the dimensions and form of the base data table. Further, in some example implementations, rather than having separate data structures for differential data, differential data can be incorporated within the corresponding delta data structures, among other examples and alternatives. Additionally, while differential data structures have been shown in some examples to be unsorted, in some implementations, differential data structures can also be sorted to conform with the sorting (e.g., by primary key value) of the corresponding base data table(s).

In some instances, base data can be utilized in a variety of applications and use cases. In some examples, data models can be developed and maintained that use, include, or depend on the base data. For instance, in the example of FIG. 7, hypothetical or provisional changes to the base data can be modeled and recorded. In one example implementation, hypothetical differential data (e.g., maintained in hypothetical differential data structures 710, 715, 725, 730 and a hypothetical delta data structure 705) can be maintained for particular modeling of hypothetical modifications to the base data. These structures can be maintained in addition to the delta data structure 410 and differential data structures 415, 420, 425, 430, 435 maintained for tracking and managing actual changes to the base data table 405. Provisional or hypothetical delta data can allow for the modeling of hypothetical or test values that are not (yet) applied to the actual base data. Further, provisional changes can be included to assess or approve the proposed or provisional changes before incorporating the changes in the base data, among many other examples.

Figure 7:
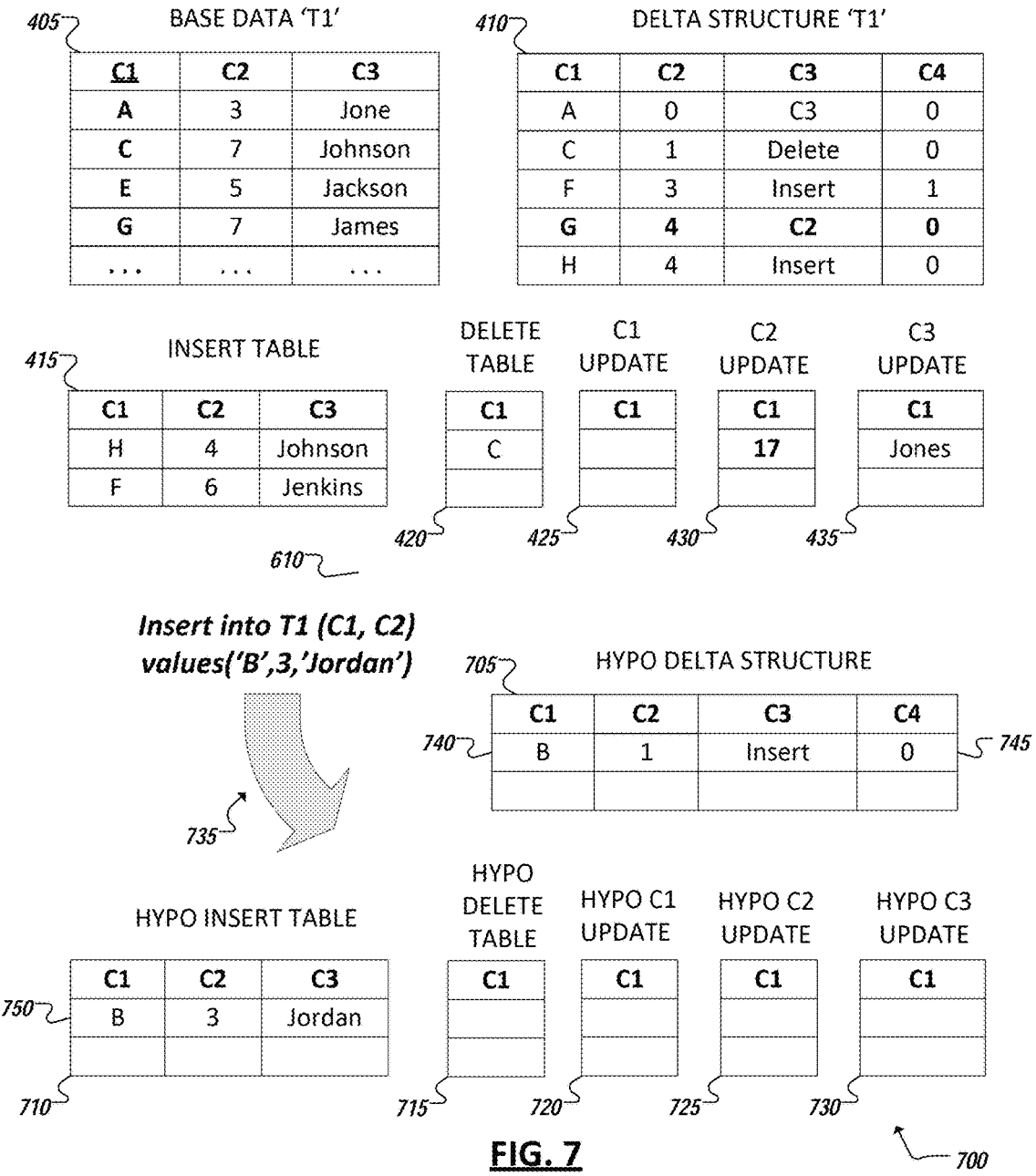
FIG. 7 is a simplified block diagram representing example operations involving an example hypothetical update data structure.

In the example of FIG. 7, while actual changes to the base data are recorded in data structures 410, 415, 420, 425, 430, 435 (e.g., as in the examples of FIGS. 4A-4D), one or more sets of hypothetical changes can be recorded, or modeled, in instances of a hypothetical delta data structure 705 and hypothetical differential data structures 710, 715, 725, 730. In some instances, hypothetical delta data structure 705 and hypothetical differential data structures 710, 715, 725, 730 can have a structure similar to the corresponding delta data structure 410 and differential data structures 415, 420, 425, 430, 435 maintained for a particular base data table 405. Modifications recorded in the hypothetical delta data structure 705 and hypothetical differential data structures 710, 715, 725, 730 can be hypothetical, preliminary, provisional, test, or experimental modifications that (absent a merge with the base table's delta data structure 410 and differential data structures 415, 420, 425, 430, 435) do not affect the base data table or fetch requests made of the base data by other clients. For example, a user, test system, or other entity can specify a hypothetical change 735 to the base data. The hypothetical change 735 can cause a record 740 to be added to hypothetical delta data structure 705, identifying a primary key, location within the base table, and type of modification, together with a pointer 745 to a record 750 in a corresponding hypothetical differential data structure (e.g., 755), as illustrated in FIG. 7. Additional hypothetical or proposed changes can trigger the addition of further records to hypothetical delta data structure 705 and hypothetical differential data structures 710, 715, 725, 730.

A hypothetical delta data structure 705 and hypothetical differential data structures 710, 715, 725, 730 can be used to model behavior and effects of the corresponding hypothetical or provisional modifications to base data table 405. For example, a hypothetical fetch request can be modeled, causing hypothetical collated data to be generated, using not only selected base data table records, delta data structure 410, and differential data, but also records of hypothetical delta data structure 705 and hypothetical differential data structures 710, 715, 725, 730 relevant to the fetch request. For instance, a hypothetical fetch request for records with primary keys of "A" through "C" can cause collated data to be assembled that includes the actual changes made to the base data records with primary keys "A" (e.g., the change from "Done" to "Jones") and "C" (e.g., the deletion of the corresponding row or tuple), but also return the hypothetically inserted row with primary key "B" (e.g., described in record 750), among other examples. As other models, applications, and systems can be based on and otherwise use the base data (as well as corresponding delta data structures and differential data structures describing modifications to the base data), the provision of hypothetical analogues to these structures can add another dimension of functionality and utility in testing, quality control, modeling, and other applications involving a system.

In some examples, hypothetical modifications modeled in hypothetical delta data structure 705 and hypothetical differential data structures 710, 715, 725, 730 can be merged into the base data. In some examples, records of hypothetical delta data structure 705 can be sorted according to the sorting employed at the base data table 405 and delta data structure 410. Further, hypothetical delta data structure 705 and hypothetical differential data structures 710, 715, 725, 730 can be merged with corresponding delta data structure 410 and differential data structures 415, 420, 425, 430, 435. Merging records of the hypothetical delta data structure 705 and hypothetical differential data structures 710, 715, 725, 730 with the delta data structure 410 and differential data structures 415, 420, 425, 430, 435, can cause the modifications to be formalized. Subsequent merges of the delta data structure 410 and differential data structures 415, 420, 425, 430, 435 into the base data table 405 can then cause the previously-hypothetical changes to be fully incorporated into the base data. In other examples, records of hypothetical delta data structure 705 and hypothetical differential data structures 710, 715, 725, 730 can be merged directly with the base data table (e.g., at the time of a merge with the delta data structure 410 and differential data structures 415, 420, 425, 430, 435, among other examples). In some cases, provisional data maintained in hypothetical delta data structure 705 and hypothetical differential data structures 710, 715, 725, 730 can expire if not approved and merged with the base data (or modification data). Merges of hypothetical delta data structure 705 and hypothetical differential data structures 710, 715, 725, 730 information can be carried out according to other thresholds, events, time schedules, etc. as well.

Other models can be dependent on, be based on, refer to, or otherwise make use of base data. Some data and software models may make use of copies of the base data. Turning now to the examples of FIGS. 8A-8C, simplified block diagrams 800a-c are shown illustrating example interactions involving a data management system 805 managing base data 810a as well as modifications of the base data through an example delta data table 815a and differential data tables 820a (e.g., utilizing one or more of the principles described above). A variety of client systems (e.g., 825, 830, 835) can access and make use of the base data 810a (and delta data table 815a and differential data tables 820a), for instance, through fetch requests and other transactions with the data management system 805 over network 150. Indeed, in the present example, one or more client systems (e.g., 830) can host one or more software or data models, such as scenarios 840, 845, that each include a private copy (e.g., 850a, 855a) of the base data 810a. The scenarios 840, 845 can also include, in some instances, copies of delta data tables and differential data (e.g., 860a, 865a, 870a, 875a) that can be used to track changes that have been made to the parent base data 810a and keep the scenario data current with the base data 810a (e.g., which is publicly accessible or accessible to a larger group of authorized users than scenarios 840, 845).

As noted above, in some examples, scenarios 840, 845 can be private in that they are controlled by, accessible to, or otherwise intended for a subset of less than the entire set of users or systems having access to the base data 810a. In some examples, scenarios (e.g., 840, 845) can allow users to explore alternative views of the base data as well as make changes to their respective copies (e.g., 850a, 855a) of the base data. Such private changes can be recorded, in some implementations, in model delta data (e.g., 88a). In some examples, model delta data 880 can utilize principles similar to those described in connection with hypothetical delta data structures and hypothetical differential data structures, such as described in the example of FIG. 7.

Figure 8A:
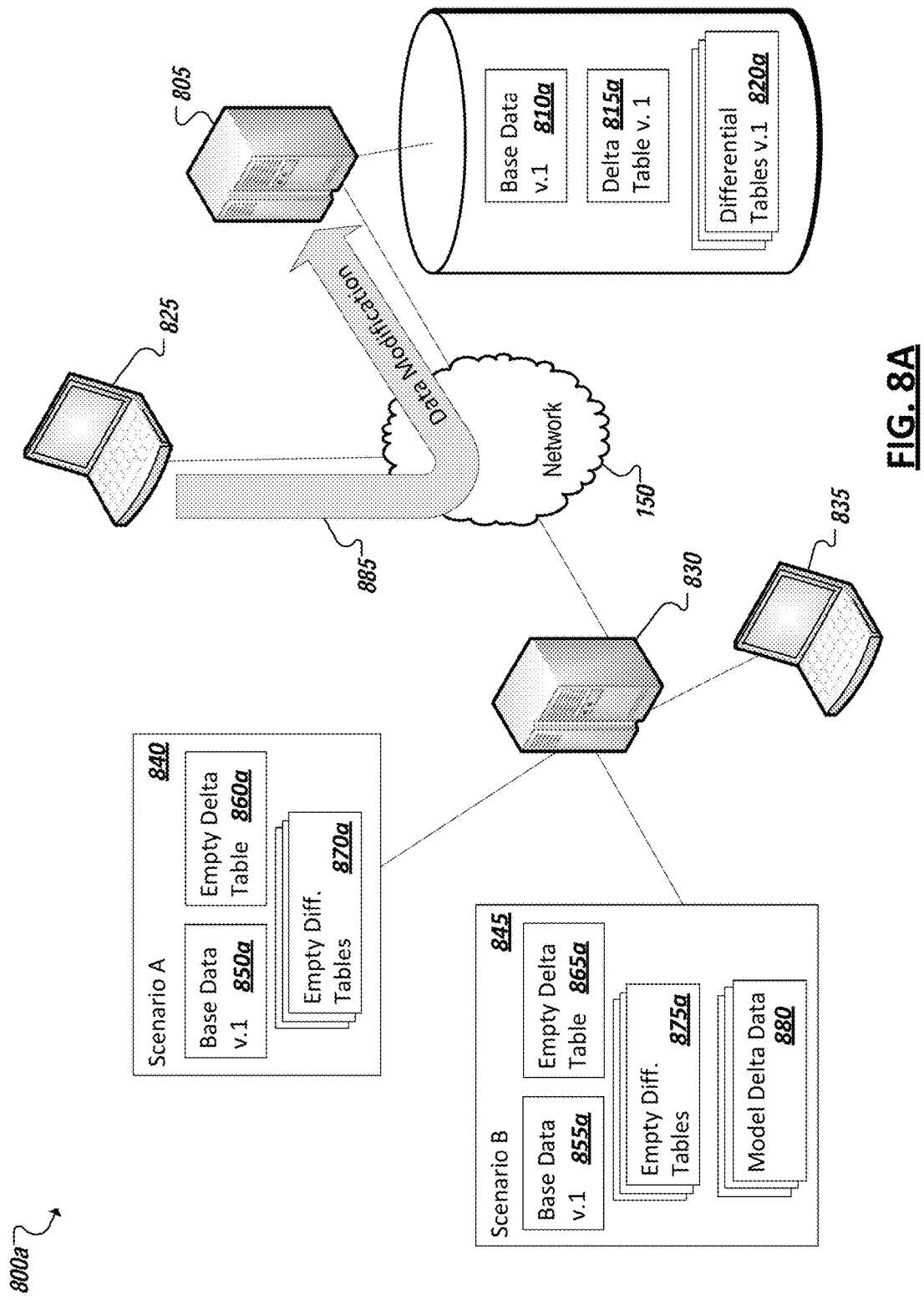

Changes to the base data 810a can be communicated to client systems managing models, such as scenarios 840, 845, based on the base data 810a. For instance, in the present example of FIG. 8A, a modification 885 can be made, for instance, by another client system 825. Accordingly, the data management system 805 can record the modification 885 in a delta table 815a and one or more differential tables 820a (e.g., according to principles of the examples of FIGS. 4A-4D). In FIG. 8A, the modification 885 and corresponding records of delta table 815a and one or more differential tables 820a are not yet included and reflected in the respective delta tables 860a, 865a and differential data tables 870a, 875a, which, in FIG. 8A, are empty.

Figure 8B:
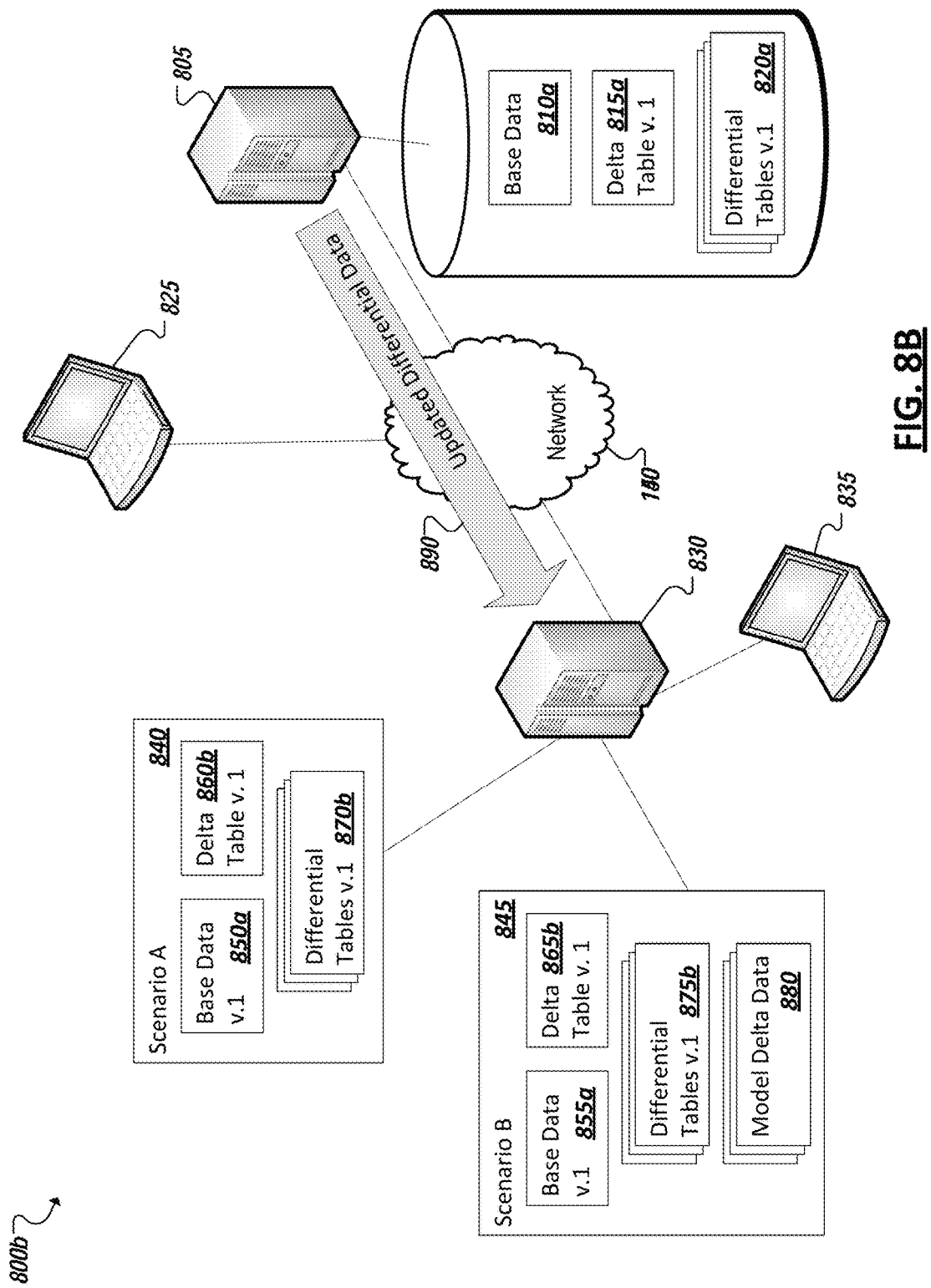

Turning to FIG. 8B, in some implementations, to assist with the maintenance of scenarios 840, 845, updated delta data can be communicated 890 from the data management system 805 to the client system(s) hosting or managing the scenarios 840, 845. In some instances, updated delta data 890 can be pulled from the data management system (e.g., according to or in response to a refresh, update or use of the scenario 840, 845, creation of a new scenario (e.g., based on an existing scenario (e.g., 840, 845), etc.). In other instances, data management system 805 can push updated delta data 890 to the client systems (e.g., 830) known to the data management system 805 as hosting or managing models (e.g., 840, 845) dependent on copies of base data 810a. For instance, updated delta data 890 can be communicated to a client system 830 based on a detected change to the base data (e.g., as recorded in delta table 815a and one or more differential tables 820a). In other instances, updated delta data 890 can be communicated to client systems (e.g., 830) by data management system 805 according to or based on a particular schedule, intervals, threshold (e.g., number of new records in delta data table 815a), etc.

Updated delta data 890, in some instances, can include at least partial copies of one or more records from delta table 815a and one or more differential tables 820a. In some instances, updated delta data 890 can include at least partial copies of the delta table 815a and one or more differential tables 820a. In the example of FIG. 8B, copies of the delta table 815a and one or more differential tables 820a are communicated to the client system 830 and adopted within the scenarios 840, 845. In some instances, the communicated copies replace or are used to update existing copies (e.g., 860b, 865b, 870b, 875b) of the delta table 815a and one or more differential tables 820a included in the scenarios 840, 845, The delta data table copies 860b, 865b and differential data tables 870b, 875b can be utilized within the respective scenarios 840, 845 to maintain the modifications (e.g., 885) made to the base data 810a and keep the dependency of the scenarios current with the state of the base data 810a. For instance, a fetch of model data (e.g., from a scenario 840, 845) can include the derivation of collated result data (e.g., utilizing principles similar to those described in connection with the example of FIG. 5). In models that include model-specific data or modifications (e.g., model delta data 880), fetch requests and operations fetching data from the model can further include consideration of the model-specific data in addition to the copies (e.g., 860b, 865b, 870b, 875b) of global delta data (e.g., as recorded in originally in delta data table 815a, differential data tables 820a, etc.) in the data that is returned, among other examples.

Turning to the example of FIG. 8C, as noted above, delta data (e.g., from delta data table 815a, differential data tables 820a) can be merged with the base data 810a by a data management system (e.g., 805) to create a version of the base data (e.g., 810b) that includes the changes of the delta data structure within the records of the base data. Additionally, in some implementations, delta data structures and differential data tables can be cleared or emptied following a merge to allow for new modifications to populate, at least temporarily, the emptied delta data structures (e.g., 815b) and differential data tables (e.g., 820b). FIG. 8C illustrates the base data 810b, delta data structure 815b, and differential data tables 820b following an example merge. As with other changes to the base data, a merge can also cause update data (e.g., 895) to be communicated to client systems hosting models dependent on copies of the base data that are to be maintained current with the state of the base data. Indeed, in some examples, copies of the base data and models utilizing such copies may not desire updates, such as in examples where the copies of the base data (and/or delta data structures and differential data tables) chronicle previous states or versions of the base data, among other examples. In the example of FIG. 8C, a merged version of the base data 810b can be communicated to client system 830 and the client system 830 can replace previous versions of the base data with copies (e.g., 850*b*, 855*b*) of the merged base data 810*b*. In other instances, the data management system 805 can communicate the merge of the base data in update data 895 causing the client systems to similarly perform a merge of their respective copies of the base data with copies of the delta data structures and differential data tables to create copies of the merged base data 850*b*, 855*b* (as well as clear copies of the delta data structures and differential data tables), among other implementations.

FIGS. 9A-9B include simplified flowcharts 900*a*, 900*b* illustrating example techniques utilizing delta data for particular base data managed by a computing system. For instance, in the example of FIG. 9A, a request, such as a request from a human user, or another system, can be identified 905 requesting modification to the base data. In some instance, the request can include the live changing of the base data by a client (either human or a device) accessing the base data. Rather than changing the base data directly at the base data structure storing the base data, however, the modification can be recorded, at least temporarily, in a delta data structure that can be later used to merge the modifications with the records of the base data structure. Such modifications can include the insertion of new records, deletion of existing records, and the changing of values of one or more columns of an existing record, among other examples. In some implementations, the base data structure can be a sorted data structure that is sorted according to a particular primary key (e.g., column). The corresponding delta data structure can be configured to be sorted consistent with the sorting of the base data structure, that is, by the same primary key values as the base data structure.

From the identified request to modify data, a particular type of modification can be identified 910 as well as the corresponding primary key value of the modified record. A record can then be added 915 to the delta data structure describing the modification, including its type. Further, in some implementations, the added record can be inserted into the delta data structure so as to maintain the sorting of the delta data structure by value of the primary key. In some instances, the described modification can be described in differential data maintained in the delta data record itself. In other instances, differential data can be maintained in separate differential data records. In such implementations, rather than including the description of the modifications directly, the delta data structure can include a pointer to the respective differential data record containing the description of the modification indexed by the delta data record.

Turning to the example of FIG. 9B, a fetch request can be serviced using a base data structure and a corresponding delta data structure. In some implementations, the delta data structure can be configured to be a structure sorted according to the same sorting as the base data structure. A request for a set of base data records can be received 930. It can be identified 935 that at least one delta record exists that is relevant to the request, the delta record identifying a change to the base data in the set. The identified delta data record can be used to generate 940 a modified record and the modified record can be collated 945 with unmodified base data records in the set to generate a collated set of records. Collating 945 the records can include adding new records to the set, deleting base data records from the set, and/or replacing records in the set with corresponding modified records that include more current, modified record values according to the modifications described in the identified delta data records. The collated set of records can then be returned 950 in response to the received 930 fetch request for use by the requester.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts, structures, architectures, and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium can be a non-transitory medium. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   identifying a proposed modification to at least one particular record of a base data structure, wherein the base data structure comprises a plurality of records and is sorted by primary key of the plurality of records;
   identifying a type of modification of the proposed modification, wherein the type comprises a particular one of a plurality of modification types;
   identifying that a particular one of a plurality of differential data structures corresponds to the particular type, wherein each of the plurality of differential data structures corresponds to a respective one of the plurality of modification types;
   adding a first record to the particular differential data structure corresponding to the particular type, wherein the first record of the particular differential data structure comprises a row within the particular differential data structure and describes the proposed modification;
   adding a second record to a delta data structure, wherein the delta data structure is sorted by the primary key, and the second record of the delta data structure includes the primary key value of the particular record, the type of the proposed modification; and a row number within the particular differential data structure of the row of the record added to the particular differential data structure;
   storing a copy of the delta data structure and the particular differential data structure with version data, wherein the version data includes a version of an updated base data structure updated using the delta data structure;
   incorporating the proposed modification into a data model using the base data structure, the particular differential data structure, the delta data structure, and the version data; and
   deleting, upon expiration of a period of time provided for approval of the proposed modification via the data model, both the first record from the particular differential data structure and the second record from the delta data structure.

2. The method of claim 1, wherein the particular type is one of a set including insertion of a new record, updating a value of an existing record, and deleting an existing record; and
   the set of differential data structures includes at least one delete table, at least one update table, and at least one insert table.

3. The method of claim 2, wherein the base data structure includes a plurality of columns and the at least one update table comprises a plurality of separate update tables, each update table in the plurality of update table corresponding to respective updates to a respective one of the plurality of columns.

4. The method of claim 2, wherein each insert table identifies record values of the corresponding inserted record including a primary key value for the corresponding inserted record.

5. The method of claim 2, wherein each update table identifies the primary key of the updated record and at least one updated value.

6. The method of claim 1, wherein the delta data structure is a binary tree structure.

7. The method of claim 1, further comprising merging information from the differential data structure and the delta data structure into the base data structure to generate an updated base data structure sorted by the primary key.

8. The method of claim 7, wherein the updated base data structure replaces the base data structure.

9. The method of claim 7, further comprising clearing differential data structures and the delta data structure used in the merging.

10. The method of claim 9, further comprising:
identifying a second proposed modification to at least one record of the updated base data structure;
identifying a type of modification of the second modification;
adding a particular record to a cleared one of the differential data structures of the type of the second modification; and
adding a particular record to the cleared delta data structure, the particular record in the cleared delta data structure identifying a primary key value of the particular record, the type of the second modification, and a row number to the particular record added to the cleared differential data structure.

11. The method of claim 7, wherein the merging is performed according to a maintenance schedule for the base data structure.

12. The method of claim 7, wherein the merging is performed in response to detecting that a threshold number of records in the delta data structure has been met.

13. The method of claim 1, further comprising causing the differential data structure and the delta data structure to be copied to a scenario including a copy of the base data structure.

14. The method of claim 13, wherein the differential data structure and delta data structure are communicated to a system hosting the scenario over a network.

15. The method of claim 1, further comprising:
identifying a provisional modification to the base data structure; and
recording the provisional modification in a provisional modification data structure.

16. The method of claim 15, wherein recording the provisional modification includes:
identifying a particular type of modification of the provisional modification;
adding a particular record to a provisional differential data structure corresponding to the particular type of the provisional modification; and
adding a record to a provisional delta data structure, wherein the provisional delta data structure is sorted by the primary key and the provisional delta data structure record includes the primary key value of the particular record, the type of the provisional modification, and a row number to the particular record added to the provisional differential data structure.

17. The method of claim 15, further comprising causing the provisional modification to apply to the base data structure.

18. The method of claim 1, wherein the delta data structure record further includes a location reference of the modified particular record in the base data structure.

19. A method comprising:
receiving a request for a set of records, at least some of the set of records included in a base data structure, wherein the base data structure includes a plurality of records and is sorted by primary key of the plurality of records;
determining that at least one of the set of records is referenced in a delta data structure, wherein the delta data structure is sorted by the primary key of the plurality of records and each record in the delta data structure describes a respective modification in a set of modifications affecting one or more of the set of records, each of the set of modifications is of a corresponding modification type, and each record in the delta data structure identifies the modification type of the corresponding modification and includes a row number of a corresponding modification record in a differential data structure corresponding to the modification type of the modification;
using the delta data structure to apply the set of modifications to the set of records and generate a modified set of records;
storing a copy of the delta data structure and the differential data structure with version data, wherein the version data includes a version of the modified set of records;
incorporating the proposed modification into a data model using the base data structure, the differential data structure, the delta data structure, and the version data;
returning the modified set of records using the data model in a response to the request; and
deleting, upon expiration of a period of time provided for approval of the proposed modification via the data model, both a record from the delta data structure and a corresponding modification record from the differential data structure upon expiration of a period of time provided for approval of the proposed modification via the data model.

20. The method of claim 19, wherein generating the modified set of records includes:
using the delta data structure to generate modified records for each of the set of modifications; and
collating, by the primary key, unmodified records of the set of records included in the base data structure with the modified records to generate a collated modified set of records.

21. The method of claim 19, further comprising determining whether a record in the delta data structure references an existing record in the set of records, wherein referenced existing records are replaced with modified records generated from modification information in the differential data structure.

22. An article comprising non-transitory, machine-readable media storing instructions operable to cause at least one processor to perform operations comprising:
identifying a proposed modification to at least one particular record of a base data structure, wherein the base data structure comprises a plurality of records and is sorted by primary key of the plurality of records;
identifying a type of modification of the proposed modification, wherein the type comprises a particular one of a plurality of modification types;
identifying that a particular one of a plurality of differential data structures corresponds to the particular type, wherein each of the plurality of differential data structures corresponds to a respective one of the plurality of modification types;
adding a first record to the particular differential data structure corresponding to the particular type, wherein the first record of the particular differential data structure comprises a row within the particular differential data structure and describes the proposed modification;

adding a second record to a delta data structure, wherein the delta data structure is sorted by the primary key, and the second record of the delta data structure includes the primary key value of the particular record, the type of the proposed modification, and a row number within the particular differential data structure of the row of the record added to the particular differential data structure;

storing a copy of the delta data structure and the differential data structure with version data, wherein the version data includes a version of an updated base data structure updated using the delta data structure;

incorporating the proposed modification into a data model using the base data structure, the particular differential data structure, the delta data structure, and the version data; and delete, upon expiration of a period of time provided for approval of the proposed modification via the data model, both the first record from the particular differential data structure and the second record from the delta data structure.

23. The article of claim 22, wherein the operations further comprise:

receiving a request for a set of records, at least some of the set of records included in the base data structure;

determining that a particular one of the set of records is referenced in the delta data structure;

using the delta data structure to identify records in differential data structures describing a set of modifications affecting one or more of the set of records;

applying the set of modifications to the set of records to generate a modified set of records; and returning the modified set of records in a response to the request.

24. A computer program product, encoded on a non-transitory, machine-readable storage medium, the product comprising:

a base data structure including a plurality of records, wherein the base data structure is sorted by primary key of the plurality of records;

a plurality of differential data structures, each differential data structure corresponding to a respective one of a plurality of modification types and including differential records, each differential record comprising a row describing a modification of the corresponding modification type made to the records of the base data structure; and a delta data structure including delta records, wherein the delta data structure is sorted by the primary key and each delta record identifies:

a value of the primary key value of a respective modified base data record, the respective modification type of a corresponding modification of the respective modified base data record, a row number of a corresponding differential record within the differential data structure record in the plurality of differential data structures corresponding to the respective modification type; wherein the corresponding differential record describes the corresponding modification;

version data including version information for the base data structure, each differential data structure, and the delta data structure; wherein the versions data includes an association between the base data structure, the delta data structure, and each differential data structure;

a data model generated by incorporation of the base data structure, the delta data structure, the differential data structure, and the version data; and a deletion mechanism to delete, upon expiration of a period of time provided for approval of the proposed modification via the data model, both a delta record from the delta data structure and a corresponding differential record from the differential data structure.

25. The product of claim 24, wherein the base data structure is a first base data structure, the delta data structure is a first delta data structure, and the product further comprises:

a second base data structure sorted by a second primary key; and a second delta data structure sorted by the second primary key.

26. The product of claim 24, wherein the differential data structure is one of a set of differential data structures capable of being pointed to by the delta data structure and each differential data structure in the set of differential data structures corresponds to a type of modification.

27. The product of claim 26, wherein the set of differential data structures includes an insert table, wherein each record of the insert table describes a respective new record to be inserted into the base data structure.

28. The product of claim 26, wherein the set of differential data structures includes a delete table, wherein each record of the delete table identifies a primary key of a record in the base data structure to be deleted.

29. The product of claim 26, wherein the set of differential data structures includes an update table, wherein each record of the update table describes a modification of a value of a respective existing record in the base data structure.

30. The product of claim 29, wherein the update table includes a set of update tables and each update table in the set corresponds to modifications to values of a respective one of a set of rows of the base data structure.

31. The product of claim 30, the set of differential data structures further includes a delete table and an insert table, wherein each record of the delete table identifies a primary key of a record in the base data structure to be deleted, and each record of the insert table describes a respective new record to be inserted into the base data structure.

32. The product of claim 24, wherein each delta record further identifies a location reference of the respective modified base data record.

33. The product of claim 24, wherein the delta data structure is a binary tree data structure.

34. A system comprising:
at least one processor;
at least one memory element;
a modification engine adapted, when executed by the processor to:
identify a proposed modification to at least one particular record of a base data structure, wherein the base data structure comprises a plurality of records and is sorted by primary key of the plurality of records;
identify a type of modification of the proposed modification, wherein the type comprises a particular one of a plurality of modification types;
identify that a particular one of a plurality of differential data structures corresponds to the particular type, wherein each of the plurality of differential data structures corresponds to a respective one of the plurality of modification types;

add a differential record to the particular differential data structure corresponding to the particular type, wherein the differential record comprises a row within the particular differential data structure and describes the proposed modification;

add a modification record to a delta data structure, wherein the delta data structure is sorted by the primary key and the modification record includes the primary key value of the particular record, the type of the proposed modification, and a row number within the particular differential data structure corresponding to the row of the differential record added to the particular differential data structure;

store a copy of the delta data structure and the particular differential data structure with version data, wherein the version data includes a version of an updated based data structure updated using the delta data structure;

incorporate the proposed modification into a data model using the base data structure, the particular differential data structure, the delta data structure, and the version data; and deleting, upon expiration of a period of time provided for approval of the proposed modification via the data model, both the differential record from the particular differential data structure and the modification record from the delta data structure.

35. The system of claim 34, further comprising the base data structure, the delta data structure, and the differential data structure.

36. The system of claim 34, further comprising a fetch engine adapted to:
receive a request for a set of records, at least some of the set of records included in the base data structure;
determine that one or more of the set of records are referenced in the delta data structure;
use the delta data structure to identify differential records in differential data structures describing a set of modifications affecting one or more of the set of records;
apply the set of modifications to the set of records to generate a modified set of records; and
return the modified set of records in a response to the request.

* * * * *

UNITED STATES PATENT AND TRADEMARK OFFICE
CERTIFICATE OF CORRECTION

PATENT NO. : 10,387,372 B2
APPLICATION NO. : 13/673963
DATED : August 20, 2019
INVENTOR(S) : Karri et al.

Page 1 of 1

It is certified that error appears in the above-identified patent and that said Letters Patent is hereby corrected as shown below:

In the Claims

In Column 24, Line 34, in Claim 1, delete "modification;" and insert --modification,-- therefor In Column 27, Line 62, in Claim 24, delete "type;" and insert --type,-- therefor In Column 27, Line 67, in Claim 24, delete "structure;" and insert --structure,-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*